US011023152B2

(12) United States Patent
Nystad et al.

(10) Patent No.: US 11,023,152 B2
(45) Date of Patent: Jun. 1, 2021

(54) METHODS AND APPARATUS FOR STORING DATA IN MEMORY IN DATA PROCESSING SYSTEMS

(71) Applicant: Arm Limited, Cambridge (GB)

(72) Inventors: Jorn Nystad, Trondheim (NO); Edvard Fielding, Trondheim (NO); Jakob Axel Fries, Malmo (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/510,200

(22) Filed: Jul. 12, 2019

(65) Prior Publication Data

US 2021/0011646 A1 Jan. 14, 2021

(51) Int. Cl.
*G06F 3/06* (2006.01)
*G06T 1/60* (2006.01)

(52) U.S. Cl.
CPC .......... *G06F 3/0644* (2013.01); *G06F 3/0604* (2013.01); *G06F 3/064* (2013.01); *G06F 3/0659* (2013.01); *G06F 3/0673* (2013.01); *G06T 1/60* (2013.01)

(58) Field of Classification Search
CPC ...... G06F 3/0604; G06F 3/064; G06F 3/0644; G06F 3/0659; G06F 3/0673; H04N 19/176
See application file for complete search history.

(56) References Cited

U.S. PATENT DOCUMENTS

| | | | |
|---|---|---|---|
| 5,159,647 A | 10/1992 | Burt | |
| 5,321,776 A | 6/1994 | Shapiro | |
| 6,130,680 A | 10/2000 | Cox | |
| 6,144,773 A | 11/2000 | Kolarov | |
| 6,148,034 A | 11/2000 | Lipovski | |
| 6,778,709 B1 | 8/2004 | Taubman | |
| 7,885,911 B2 | 2/2011 | Cormode | |
| 8,346,823 B2 | 1/2013 | Gaeta | |
| 8,542,939 B2 | 9/2013 | Nystad | |
| 8,990,518 B2 | 3/2015 | Nystad | |
| 9,014,496 B2 | 4/2015 | Nystad | |
| 9,116,790 B2 | 8/2015 | Nystad | |
| 2005/0174355 A1 | 8/2005 | Sadowsky | |
| 2006/0256868 A1* | 11/2006 | Westerman | ............ H04N 19/17 375/240.24 |
| 2007/0237410 A1 | 10/2007 | Cormode | |
| 2009/0096645 A1 | 4/2009 | Yasuda | |
| 2009/0244074 A1 | 10/2009 | Montrym | |
| 2009/0287702 A1* | 11/2009 | Pascucci | ................. G06F 16/51 |
| 2010/0328329 A1 | 12/2010 | Mallett | |

(Continued)

*Primary Examiner* — Charles Rones
*Assistant Examiner* — Hewy H Li
(74) *Attorney, Agent, or Firm* — Vierra Magen Marcus LLP

(57) ABSTRACT

When storing an array of data in memory, the data array is divided into a plurality of blocks, and for respective groups of the blocks that the data array has been divided into, a set of data representing the group of blocks that includes: for each block of the group of blocks, a set of data for that block of the group of blocks; and a size indication for each of one or more of the blocks of the group of blocks, the size indication for a block of a group of blocks indicating the size in memory of the set of data for that block of the group included in the stored set of data representing the group of blocks, is stored. A set of header data is also stored separately for each group of blocks of the data array.

19 Claims, 6 Drawing Sheets

(56) References Cited

U.S. PATENT DOCUMENTS

| | | |
|---|---|---|
| 2011/0249755 A1 | 10/2011 | Shibahara |
| 2011/0274155 A1 | 11/2011 | Noh |
| 2013/0036290 A1 | 2/2013 | Nystad |
| 2013/0195352 A1 | 8/2013 | Nystad |
| 2013/0235031 A1 | 9/2013 | Karras |
| 2016/0232220 A1* | 8/2016 | Newhouse ............ G06F 16/162 |
| 2016/0371190 A1* | 12/2016 | Romanovskiy ......... G06F 3/064 |
| 2017/0285955 A1* | 10/2017 | Carter ....................... G06T 1/60 |
| 2019/0260388 A1* | 8/2019 | Wegener .................. H04B 1/66 |

* cited by examiner

METHODS AND APPARATUS FOR STORING DATA IN MEMORY IN DATA PROCESSING SYSTEMS

BACKGROUND

The technology described herein relates to a method of and apparatus for storing data in memory in data processing systems, and in particular to such a method and apparatus for use to store data arrays, e.g. representing images, such as texture data and frame buffer data, for use in computer graphics processing systems.

It is common in computer graphics systems to generate colours for sampling positions in a frame to be displayed by applying so-called textures or texture data to the surfaces to be drawn. For example, surface detail on objects may be generated by applying a predefined "texture" to a set of primitives representing the object, to give the rendered image of the object the appearance of the "texture". Such textures are typically applied by storing an array of texture elements or "texels", each representing given texture data (such as colour, luminance, and/or light/shadow, etc. values), and then mapping the texels onto the corresponding elements, such as (and, indeed, typically) a set of sampling positions, for the frame to be displayed. The stored arrays of texture elements (data) are typically referred to as "texture maps".

Such arrangements can provide high image quality, but have a number of drawbacks. In particular, the storage of the texture data and accessing it in use can place, e.g., high storage and bandwidth requirements on a graphics processing device (or conversely lead to a loss in performance where such requirements are not met). This is particularly significant for mobile and handheld devices that perform graphics processing, as such devices are inherently limited in their, e.g., storage, bandwidth and power resources and capabilities.

It is known therefore to try to store such texture data in a "compressed" form so as to try to reduce, e.g., the storage and bandwidth burden that may be imposed on a device.

A further consideration when storing, e.g., texture data (whether compressed or not) for use in graphics processing is that typically the graphics processing system will need to be able to access the stored texture data (or other data) in a random access fashion (as it will not be known in advance, e.g., which part or parts of the texture map will be required at any particular time). (This is in contrast to other processors, such as a display processor or a video processor, that may also process data arrays representing images, but which will process the data arrays (images) in a predefined, e.g. scan line, order. In graphics processing (e.g. a graphics processor), no such assumptions on the access pattern or order for a data array can be made).

This places a further constraint on the storage of the, e.g. texture data, as it is accordingly desirable to be able to store the texture data in a manner that is suitable for (and efficient for) random access to the stored data.

This problem can be exacerbated where the size of different portions of the stored, e.g., texture, data in memory can vary, e.g. because the compression rate applied to the texture data is variable. This will typically be the case for losslessly compressed data arrays (e.g. images), as in that case the compression will necessarily have a variable bit-rate with different numbers of bits being allocated to different data elements in the array (e.g. pixel in the image).

The Applicants accordingly believe that there remains scope for, and a need for, more efficient arrangements for storing data, such as texture data for use in graphics processing, in memory.

BRIEF DESCRIPTION OF THE DRAWINGS

A number of embodiments of the technology described herein will now be described by way of example only and with reference to the accompanying drawings, in which.

DETAILED DESCRIPTION

Figure 1:
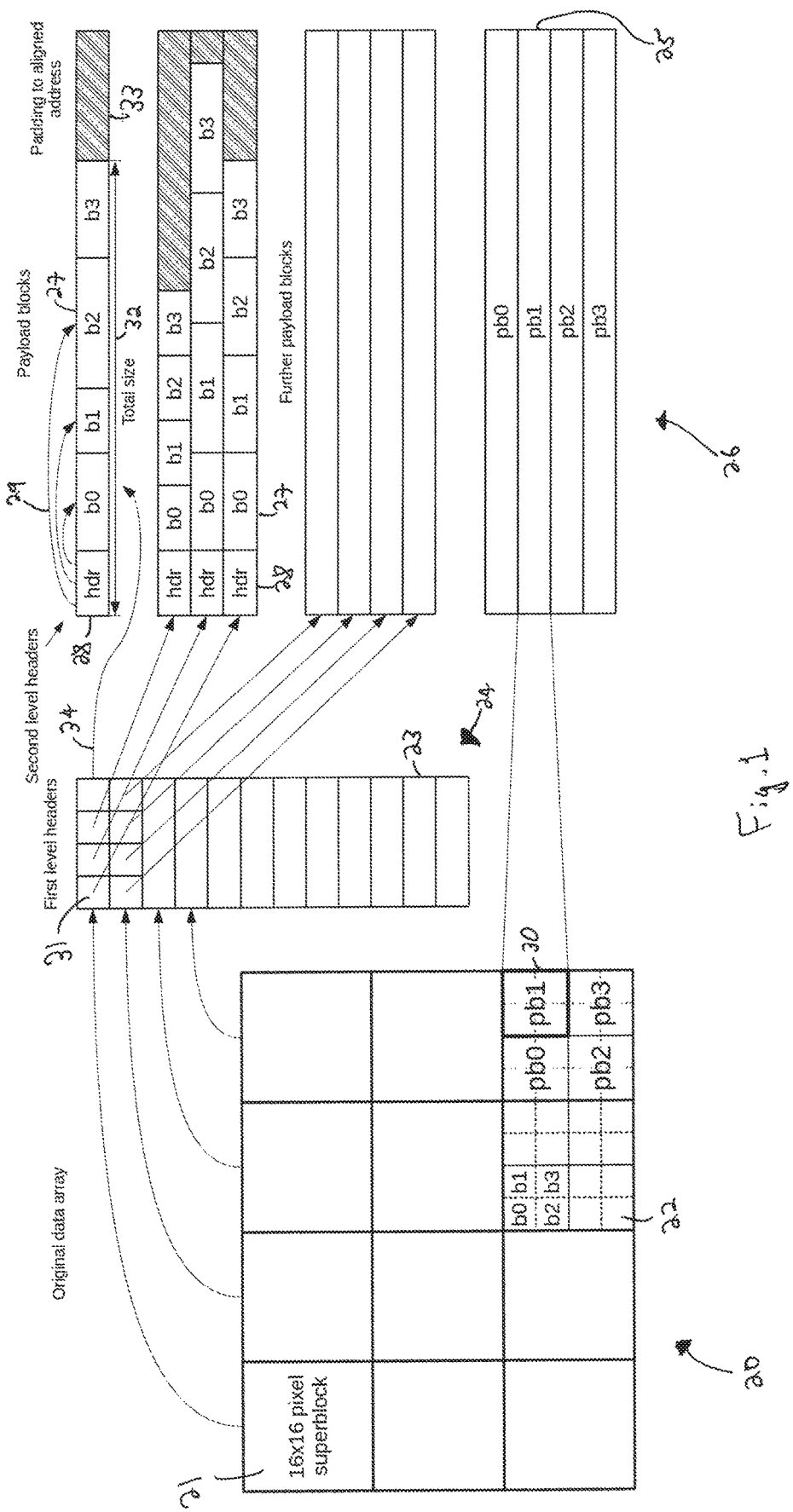
FIG. 1 shows schematically the storing of an array of data in accordance with an embodiment of the technology described herein.

A first embodiment of the technology described herein comprises a method of storing an array of data in memory, the method comprising:

dividing the array of data to be stored into a plurality of blocks;

for at least one group of the blocks that the data array has been divided into, storing a set of data representing the group of blocks of the data array in memory, the set of data representing the group of blocks of the data array including:
  for each block of the group of blocks, a set of data for that block of the group of blocks; and
  a size indication for each of one or more of the blocks of the group of blocks, the size indication for a block of a group of blocks indicating the size in memory of the set of data for that block of the group included in the stored set of data representing the group of blocks;

the method further comprising:
  storing, for each group of blocks of the data array for which a set of data has been stored, a set of header data separately to the set of data representing the group of blocks of the data array, the header data for a group of blocks of the data array indicating the total size in memory of the set of data for the group of blocks of the data array that the header data relates to.

A second embodiment of the technology described herein comprises an apparatus for storing an array of data in memory, the apparatus comprising:

an encoding circuit configured to store, for at least one group of blocks of a plurality of blocks that the data array has been divided into for encoding purposes, a set of data representing the group of blocks of the data array in memory, the set of data representing the group of blocks of the data array including:
  for each block of the group of blocks, a set of data for that block of the group of blocks; and
  a size indication for each of one or more of the blocks of the group of blocks, the size indication for a block of a group of blocks indicating the size in memory of the set of data for that block of the group included in the stored set of data representing the group of blocks;

the apparatus further comprising:

a header generating circuit configured to store for a group of blocks of the data array for which a set of data has been stored, a set of header data separately to the set of data representing the group of blocks of the data array, the header data for a group of blocks of the data array indicating the total size in memory of the set of data for the group of blocks of the data array that the header data relates to.

In the technology described herein, an array of data to be stored in memory (which may be, as discussed above, an array of texture data for use in graphics processing, for example) is divided into plural blocks.

Data representing respective groups of the blocks, which includes for each group of blocks, a set of data for each block of the group of blocks in question, and a size indication or indications indicating the size(s) of the set(s) of data for one or more of the individual blocks of the group of blocks, is stored in memory.

In addition, a separate set of header data indicating the size in memory of the data for the group of blocks is stored.

In effect therefore, the technology described herein uses a two-level header/data block size encoding arrangement, in which an overall size indication for a group of blocks of the data array is stored separately, as a "first level" header, but then size indications for individual data blocks are stored as, in effect, a "second level" header with the data for the blocks themselves.

As will be discussed further below, this all facilitates identifying and determining the location of the data for the blocks and groups of blocks in the memory, and so, inter alia, reduces the constraints on storing that data. For example, there is no need to store the data for the individual blocks at fixed or predefined memory locations, nor in fixed-sized memory locations, as the separate header data size information, and the block size information, can be used to retrieve the blocks' data.

Also, by dividing the data array into blocks in this manner, the stored data can effectively be accessed randomly at the data block level (i.e. random access is available to the individual blocks that the data array is divided into).

The effect of this is that the technology described herein can provide a data storage arrangement that can link, inter alia, variable sized compressed data in memory whilst still allowing random access to parts of that data. When it is used for compressed texture data, for example, the technology described herein can allow variable-sized compressed texture data to be fetched without needing to decompress the entire texture data array. When used for other data, such as a frame (the frame buffer) in graphics, it can facilitate simple rotation and cropping, for example. This can all help to reduce bandwidth and power on a system level.

Furthermore, including size indications indicating the sizes of the sets of data for individual blocks of the group of blocks in the set of data that is stored for each group of blocks in the memory, means that the separate, "first level", header data for each group of blocks does not need to store that data, and so can, and does, simply store an indication of the size of memory of the overall set of data that is stored for the group of blocks in question.

This then means that the separate, "first level" headers (header data) for each group of blocks can be kept relatively small (as they do not, for example, need to store an indication of the sizes of the individual data blocks in memory).

This can then reduce latency when retrieving and using the data array, and therefore improve the overall efficiency and operation of a processor and data processing system that is using the data array.

In particular, making the separate, "first level" headers (the header data) for each group of data blocks smaller in the technology described herein, means that that header data may be more likely to remain in a cache of the data processor (e.g. graphics processor) that is using the data array, thereby reducing and/or removing any latency associated with the initial fetching of that header data.

The data array that is to be stored in the technology described herein can be any suitable data array. It should comprise a plurality of data elements (entries), each occupying different positions in the array. The data array in an embodiment represents an image. The data array may be, and in an embodiment is, compressed before being stored in the manner of the technology described herein.

As discussed above, in one embodiment the data array is a graphics texture.

However, the technology described herein is not exclusively applicable to graphics textures, and may equally be used for other forms of data array, e.g. images. For example, the Applicants believe the technology described herein may be equally useful for storing frames for display (frame buffer data) (for use as a frame buffer format), e.g. in graphics processing systems and for use with display processors, as it can, for example, give predictable memory read patterns for a display processor and facilitate simple rotation and cropping when used as a frame buffer format. Thus, in an embodiment the data array is a frame to be stored in a frame buffer, e.g. for display.

In an embodiment, the technology described herein is used both when storing texture data and frames (as the frame buffer format) in a graphics processing system. Thus, the technology described herein also extends to a graphics processing system and a graphics processor that uses the arrangement of the technology described herein for storing both texture data and frames (as its frame buffer format).

The technology described herein may also be used, for example, in image signal processing (image signal processors) and video encoding and decoding (video encoders and decoders).

The blocks that the data array (e.g. texture) to be stored is divided into can take any suitable and desired form. Each block should, and in an embodiment does, comprise a sub-set of the data elements (positions) in the array, i.e. correspond to a particular region of the array. In an embodiment the array is divided into non-overlapping and regularly sized and shaped blocks.

In an embodiment, the data array is divided into 4×4 data element (position) blocks (i.e. blocks of 4×4 array positions (entries)). Thus, in the case of a texture map, for example, each block will in an embodiment correspond to 4×4 texels, and in the case of a frame for the frame buffer, each block will in an embodiment correspond to 4×4 pixels or sampling positions of the frame. Other arrangements would, of course, be possible.

Sets of data are stored for groups of the blocks that the data array has been divided into. Each group of blocks for which a (collective) set of data is stored can comprise any desired number of blocks. In an embodiment each group of blocks comprises plural blocks. Thus, each group of blocks in an embodiment comprises n blocks (where n is an integer greater than 1). In an embodiment, n is 2 or 4.

Each group of blocks of a data array for which a set of data is stored in an embodiment contains the same number of blocks (and has the same configuration of blocks). In one embodiment each group of blocks comprises two blocks, in a 2×1 or 1×2 configuration. In another embodiment, each group of blocks of the data array comprises four blocks, in a 2×2, 4×1 or 1×4 configuration.

Other arrangements would, of course, be possible.

In an embodiment the entire data array is divided into a set of (equal) blocks, with the blocks then being arranged into plural corresponding (equal) groups of blocks, and a set of a data (and a set of separate header data) is stored for each group of blocks that the data array has been divided into.

For at least one group of blocks of the data array (and in an embodiment for plural groups of blocks of the data array), a set of data that includes a (separate) set of data for each (individual) block in the group of blocks, and a size indication for each of one or more of the blocks of the group of blocks, is stored.

In one embodiment, a set of data that includes a (separate) set of data for each (individual) block in the group of blocks, and a size indication for each of one or more of the blocks of the group of blocks, is stored for each group of blocks that the data array has been divided into.

However, as will be discussed further below, the Applicants also contemplate embodiments in which some groups of blocks may be stored in an uncompressed form, in which case the set of data that is stored for those uncompressed groups of blocks may (and in an embodiment does) solely comprise a (separate) set of data for each (individual) block in the group of blocks and does not include any size indications.

Thus in an embodiment, while a set of data that includes a (separate) set of data for each (individual) block in the group of blocks, and a size indication for each of one or more of the blocks of the group of blocks, is stored for at least one (and in an embodiment for plural) group of blocks of the data array, for at least one (other, different) group of blocks of the data array, a set of data that does not include any size indications (and that (solely) comprises a (separate) set of uncompressed data for each (individual) block in the group of blocks) is stored.

The set of "block" data that is stored (individually) for a block of the data array can take any suitable and desired form, and will depend, as will be appreciated by those skilled in the art, upon the nature of the data array being stored, e.g. whether it is a texture, a frame for the frame buffer, whether and how the data array has been encoded, compressed, etc. The stored block data should be some or all of the data that is required for and/or that relates to, the data array positions (entries) that the block corresponds to (represents). In an embodiment a (and each) set of "block" data is some or all (and in an embodiment all) of the data that is required to derive (generate) data values for the data elements of the block in question.

In the case of a texture, for example, the data that is stored for a block should be data to allow appropriate texture data (texel values) for the block to be determined. Such texture data could comprise, e.g., a set of colour values (Red, Green, Blue (RGB), a set of colour and transparency values (Red, Green, Blue, Alpha (RGBa)), a set of luminance and chrominance values, a set of shadow (light)-map values, a set of a normal-map (bump-map) values, z values (depth values), stencil values, luminance values (luminance textures), luminance-alpha-textures, and/or gloss-maps, etc.

In the case of a frame for display, to be stored in a frame buffer, the data that is stored for a block should be data to allow appropriate pixel and/or sampling position data (values) for the block to be determined. Such pixel data could comprise, e.g., appropriate colour (RGB) values, or luminance and chrominance values.

In the case where the data that the data array relates to comprises plural data components (channels) (e.g. luminance and chrominance components, or RGB components), then the different data components (channels) could be stored together as a single data array that is stored in the manner of the technology described herein, or some or all of the different data components (channels) could be treated as separate data arrays that will then each be stored in the manner of the technology described herein separately. For example, in the case of a frame that is represented using luminance and chrominance values, the luminance data could be stored as one data array, with the chrominance data (or each chrominance component) being stored as another, separate data array or arrays, in the manner of the technology described herein.

A block of the data array may be stored in an uncompressed form. In this case the data that is stored for a block of the data array will comprise (and indicate directly) the data array values for the data array elements (positions) that the block corresponds to. In this case the data for the block of the data array may, and in an embodiment does, comprise the original data element values for the block in question.

In an embodiment, a (and in an embodiment plural, and in an embodiment each) block of the data array is encoded and/or compressed before being stored. In this case, the data that is stored for a block of the data array will comprise data from which the data array values for the data array elements (positions) that the block corresponds to can be derived (i.e. data to be used to, and to allow, the data array values for the data array elements (positions) to be determined).

Thus, in an embodiment, the technology described herein comprises encoding, e.g. compressing, the original data entries in the data array for a block, to generate an encoded, e.g. compressed, representation of the data values for those data entries, and then storing some or all (and in an embodiment all) of the encoded, e.g. compressed, representation of the data values as the set of data for the block.

In the case where the block data is an encoded, e.g., compressed, representation of the data values for the data entries of the block in question, then any suitable and desired encoding (compression) scheme can be used to encode the blocks. In an embodiment, a lossless compression scheme is used to encode (compress) the blocks. In an embodiment an entropy encoding scheme is used for this purpose, such as, and in an embodiment Huffman-coding or quad-tree-based encoding. The encoding scheme should be, and in an embodiment is, such that a given block can be decoded in its entirety using the stored set of data for the block (and independently of any other block and of the data for any other block). In one embodiment the encoding scheme is such that a given block can be decoded in its entirety (independently of any other block), but decoding parts of an individual block is not cheaper than decoding the entire block. In another embodiment, the encoding scheme is such that decoding parts of an individual block is cheaper than decoding the entire block.

In an embodiment, the data for the blocks of the data array can be selectively stored in an encoded (compressed) form. For example, and in an embodiment, it may be determined whether encoding the blocks of data of a group of blocks of data would result in a set of encoded data that is larger than the size of the uncompressed input data for that group of blocks, and to, in that event, store the data for the group of blocks without encoding (compressing) it. In other words, the process will preferentially store the block data for a (and each) group of blocks of the data array in an encoded (compressed) form, unless the encoded (compressed) representation of the group of blocks of data results in a set of data that is larger than the group of blocks of the data array in their uncompressed form, in which case the group of blocks of data is in an embodiment stored uncompressed (without encoding it).

In the case where blocks of the data array can be stored in an encoded or unencoded form, the decision as to whether to store blocks in an encoded or unencoded form is in an embodiment made for each group of blocks as a whole (i.e. such that any given group of blocks will only be stored entirely in an encoded form or entirely in an unencoded form) (there will not be within any given group of blocks, some blocks that are encoded and some blocks that are unencoded).

Other arrangements would, of course, be possible.

In an embodiment, the sets of "block" data for each block of a given group of data blocks are stored in the set of data for the group of blocks one after another, in an embodiment contiguously. Thus the set of data for a group of blocks will be stored in a sequence of contiguous memory locations, with the individual blocks' data being contiguous within that sequence.

The sets of data for the individual blocks are in an embodiment stored in the same (in an embodiment particular, in an embodiment selected, in an embodiment predefined) block order within the stored set of data for each group of plural blocks. This order may, e.g., and in an embodiment, follow a given "space-filling" path over the blocks of the group of blocks, such as a raster order or a Morton (Z) order.

In the technology described herein, for at least some of the groups of blocks for a data array, the stored set of data representing the group of blocks of the data array, as well as storing (individual) sets of "block" data for the (individual) blocks of the group of blocks (as discussed above), also stores a size indication for each of one or more of the blocks of the group of blocks in question.

Each such "block" size indication should and in an embodiment does indicate the size of the set of data that is stored for the block of the data array in question in the set of data for the group of blocks of the data array that the block belongs to. The size indications can be given in any suitable and desired manner, but in an embodiment indicate the size in bytes of the data representing the block in question.

The encoder in an embodiment determines the block size during the (entropy) encoding process (with the group size then being the sum of the block sizes).

Each block size indication in an embodiment occupies a fixed sized field in the stored set of data representing the group of blocks of the data array.

The block size indication(s) can be stored in the set of data representing the group of blocks in any suitable and desired manner. In an embodiment the size indications are stored at a particular, in an embodiment selected, in an embodiment predefined, and in an embodiment fixed-sized, location in the set of data representing the group of blocks. In one embodiment, the size indication(s) are stored at the beginning of the set of data representing the group of blocks (and before (and contiguous with) the individual blocks' data). In another embodiment, the size indication(s) are stored at the end of the set of data representing the group of blocks (and after the individual blocks' data).

Where the set of data includes plural block size indications, the different block size indications are in an embodiment included in the set of data in a particular, in an embodiment selected, in an embodiment predefined, block order (and in an embodiment corresponding to the order in which the individual blocks' data is arranged in the set of data for the group of blocks).

Other arrangements would be possible, if desired.

Where the set of data that is stored for a group of blocks includes one or more block size indications, in one embodiment the set of data includes a (separate) size indication for each block of the group of blocks (for all the blocks in a group of blocks). In another embodiment, the set of data includes a (separate) size indication for some but not all of the blocks of the group of blocks, and in an embodiment for all except one block of the group of blocks.

The number of blocks of the group of blocks for which a size indication is provided may, and in an embodiment does, depend upon the nature of the size indication for the set of data representing the group of blocks that is included and provided as the separate header data (in the manner of the technology described herein).

In one embodiment (and as will be discussed further below), the separate header data that is stored for a group of blocks (and for each group of blocks) simply indicates whether the group of blocks has been stored in a compressed or uncompressed form. In this case, the set of data for the group of blocks in an embodiment comprises a separate size indication for each block of the group of blocks, at least in the case where the header data for the group of blocks indicates that the group of blocks is stored in a compressed form. In an embodiment in this arrangement, in the case where the data of a group of blocks is stored in an uncompressed form, then the set of data for the group of blocks does not contain any size indications for blocks of the group of blocks at all.

Thus, in one embodiment, the header data that is stored separately for a group of blocks of the data array indicates for the respective group of the blocks of the data array whether the data for the blocks of the group of blocks is stored in a compressed or uncompressed form, and in the case that the header data indicates that the data for the corresponding group of blocks is stored in a compressed form, the set of data for the group of blocks stores the data for the blocks of the group of blocks in a compressed form, and stores a separate size indication for each block of the group of blocks (such that if there are four blocks in a group of blocks, four separate size indications, one for each block of the group of blocks, will be stored in the set of data representing the group of blocks), but when the header data for a group of blocks indicates that the group of blocks is stored in an uncompressed form, the data for the blocks of the group of blocks is stored in the set of data for the groups of blocks in an uncompressed form, and no size indications for the blocks of the group of blocks are stored in the set of data representing the group of blocks (since in this latter case, the size of the data that is stored for each individual block will be otherwise known, since it will correspond to the (known) uncompressed block size, and so there is no need to additionally store a separate size indication in this case).

In another embodiment, the separate header data for each group of blocks contains an indication of the actual size of the set of data that is stored for the group of blocks (rather than simply indicating that the blocks are compressed or uncompressed). In this case, the set of data representing the group of blocks in an embodiment includes a size indication for all except one of the blocks of the group of blocks (since that information, together with the total size of the data for the group of blocks indicated in the separate header can then be used to identify the data of each individual block within the set of data for the group of blocks).

Thus, in this case, where each group of blocks comprises two blocks, the set of data representing the group of blocks will store a size indication for one of the blocks of the group of blocks (but not the other block of the group of blocks). In the case where the group of blocks of data comprises four blocks, the set of data representing the group of blocks will store indications of the size for each of three of the blocks of the group of blocks (but not for the fourth block of the group of blocks).

The block of the group of blocks for which no size indication is stored in the set of data representing the group of blocks of the data array in these embodiments can comprise any desired one of the blocks of the group of blocks, but in an embodiment comprises the last (final) block of the group of blocks of data (in the order that the sets of data for the blocks are stored in memory). Thus, in the case of a group of blocks that comprises two blocks, a size indication will be stored for the first block but not for the second block. Correspondingly, for a group of blocks comprising four blocks of the data array, size indications are in an embodiment stored for the first three blocks of the group of blocks, but not for the fourth block of the group of blocks.

Thus, in an embodiment, the header data that is stored separately for a group of blocks of the data array indicates the actual size of the set of data that is stored for the respective group of the blocks of the data array, and the set of data for the group of blocks stores the data for the blocks of the group of blocks, in an embodiment in a compressed form, and stores a separate size indication for all except one of the blocks of the group of blocks (such that if there are four blocks in a group of blocks, three separate size indications, one for each of three blocks of the group of blocks, will be stored in the set of data representing the group of blocks).

It will be appreciated from the above, that in the technology described herein, for a given data array, there will be plural sets of data, each corresponding to a respective group of blocks of the data array, to be stored in the memory.

These plural sets of data for the groups of blocks making up the data array can be stored in memory in any desired and suitable manner and arrangement.

In an embodiment, the sets of data for the groups of blocks for a data array are stored together in memory, one-after-another, in an embodiment in a buffer (a "payload" buffer) that has been allocated (set aside) for this purpose. The sets of data for the groups of blocks may be, and in an embodiment are, stored in accordance with a particular, in an embodiment selected, in an embodiment predefined, order, e.g., and in an embodiment, with respect to (corresponding to) the positions of the blocks and groups of blocks in the data array (such as following a raster or some other order across the data array).

The sets of data for the groups of blocks for a data array could simply be stored one after another, contiguously, in memory.

However, in an embodiment, each set of data representing a group of blocks of the data array is stored in its own, fixed size, and in an embodiment address aligned, block of memory (in the "payload" buffer). In other words, the data array is in an embodiment stored by allocating a plurality of fixed sized, in an embodiment address aligned, "payload" blocks in memory for the purpose of storing the sets of data representing groups of blocks of the data array, and the set of data for each group of blocks of the data array for which a set of data is stored is stored in its own, separate "payload" memory block.

Each such "group of blocks" payload storage memory block in an embodiment contains a fixed number of bytes of data, such as 256, 512 or 1024 bytes of data. In an embodiment, each group of blocks storage (payload) block is sized so as to be able to store (and to correspond to the size of) an uncompressed group of blocks of the data array. Thus, in the case where each group of blocks comprises n, e.g. four, blocks of the data array, each payload block that is to store a set of data for a respective group of blocks of the data array in an embodiment comprises the size of n, e.g. four, uncompressed blocks of the data array.

Thus, in an embodiment, each group of blocks for which a set of data is to be stored in memory will be allocated its own, respective "payload" block in the memory, which payload memory block in an embodiment starts at an aligned memory address, and which payload memory block will be the size of the uncompressed group of blocks of the data array.

The Applicants have recognised that in these arrangements, in the case where data for the blocks of a group of blocks is stored in a compressed manner, then the set of data for the group of blocks may not fill the entire "payload" block allocated to that group of blocks in the memory. In this case, any unused space in the "payload" block for a group of blocks is in an embodiment padded with dummy data so as to fill the payload block. (Thus, set of data for the "next" group of blocks should, and in an embodiment is, stored in its own, next payload block, that should, and in an embodiment does, start at its own, allocated, and aligned, "start" memory address (rather than being used to fill any unused capacity in the preceding payload block).)

Such an arrangement will mean that even if the data array is stored in a compressed form, it will still take up the same space (memory allocation) in main memory as if it was uncompressed. However, there will still be savings in terms of internal bandwidth and memory when using the data array, because the arrangement of the technology described herein will allow a processor that is using the data array to fetch only the useful data from the stored array in memory in use (without any dummy, padding data). Thus, there will still be savings in terms of internal memory resources and bandwidth when using a data array that has been processed and stored in the manner of the technology described herein.

Each set of data for a group of blocks of a data array (e.g. each payload block containing a set of data for a group of blocks of the data array) could be stored at its own, individual address in the memory (and in one embodiment, this is what is done). In this case, the separate header data for a group of blocks of the data array could contain additional address information indicating the location in memory of the set of data for the group of blocks of the data array that the header data block relates to, such as a pointer to the memory location (address) of the set of data for the group of blocks, or an offset from some other (known) memory location (address), to allow the memory location of the set of data (of the payload block) for the group of blocks in question to be determined.

In an embodiment, the sets of data (the payload memory blocks) for the groups of blocks of the data array are stored at predictable memory addresses (locations in memory). In an embodiment, they are stored at memory addresses (locations) that can be predicted from (that are determined from) the position in the data array of a data element and/or of a data block and/or of the group of data blocks that the set of data relates to. Thus, the storage location (memory address) of each set of data block group data (e.g. within a "payload" buffer having a known location in memory) is in an embodiment dependent upon the position within the data array of the group of blocks of the data array that the set of data relates to.

In an embodiment, the storage location (memory address) for set of block group data, e.g. a payload memory block, relative to the start location (address) of the "payload" buffer for a data array, is determined by means of a predetermined function of the relative position of the group of data blocks (or a data block or data element) within the data array that the set of (data block group) data relates to. In an embodiment, for a data array having vertical and horizontal dimensions xsize and ysize, respectively, and divided into a×b-sized data blocks, and having a block group set payload block data size h (in bytes), then if A is the start address of the payload buffer in memory, the memory address (location) of the payload memory block for a given data element of the array (e.g. texel/pixel) at position x, y is given by:

payload memory block address=$A+h*(x/a+(y*xsize)/b)$

Storing the sets of data for the groups of blocks of the data array in the above manners (e.g. in fixed size and aligned "payload" blocks, in an embodiment at predictable locations in the memory), further facilitates reducing the amount of data that needs to be provided as separate header data for the data array, thereby, as discussed above, further facilitating more efficient access to and fetching of the required data for the data array in use.

In the technology described herein, as well as storing sets of data for respective groups of blocks of the data array, for each group of blocks of the data array for which a set of data is stored, a separate set of header data is generated and stored, which header data indicates the size of the set of data that is stored in the memory for the group of blocks of the data array that the header data relates to.

The separate header data for a group of blocks of the data array can indicate the size of the set of data that is stored in the memory for the group of blocks of the data array in any suitable and desired manner.

In one embodiment the header data simply indicates whether the set of data that is stored in the memory for the group of blocks of the data array stores the blocks of the data array in a compressed or uncompressed form. In this case the header data that indicates the size of the set of data for the group of blocks of the data array could comprise a single bit, which can be set to indicate whether the blocks of the group of blocks have been compressed or not.

In another embodiment, the separate header data for a group of blocks indicates an actual size of the set of data that is stored in the memory for the group of blocks of the data array in question. This size is in an embodiment indicated in terms of a number of bytes that the set of data for the group of blocks occupies in the memory. In this case, the header data in an embodiment comprises a fixed-size field that can be used to provide the relevant size indication.

In this case, the size indication in an embodiment indicates the total size of the stored set of data for the group of blocks, i.e. the total, combined size of the actual stored, (useful) data representing the blocks of the group of blocks of the data array and of any (and all) block data size indications included in the set of data for the group of blocks (but excludes the size of any dummy, "padding" data that has been included so as to, e.g., fill the "payload" block in the memory where the set of data for the group of blocks of the data array is being stored).

In an embodiment of these arrangements, one or more size indication values that may be provided as header data for a group of blocks are predefined as (and set aside for) indicating a particular, in an embodiment selected, in an embodiment predefined, situation (special case), such as (and in an embodiment) that the blocks of the group of blocks are uncompressed in the set of data representing the group of blocks. This can allow the scheme of the technology described herein to indicate such special cases in a more efficient manner.

The size indication values that are used to indicate "special cases" are in an embodiment size indication values that may in fact never be used (e.g. because they will be impossible to achieve with the compression scheme being used). It would also be possible to deliberately set a size indication value (or values) that could occur in normal use aside for this purpose, if desired, e.g., by encoding encoded blocks that would normally have that size value such that they instead have a different size value.

The header data for a group of blocks of the data array could comprise other data in addition to an indication of the size of the set of data that is stored in the memory for the group of blocks of the data array, if desired, such as, if necessary, and as discussed above, an indication, such as a pointer or offset, of the location in memory where the set of data for the group of the blocks of the data array in question is stored. It would also be possible, e.g. to indicate other information about a group of blocks, such as if a group of blocks is completely transparent, or completely opaque (which could be useful, e.g., for multi-layer blending purposes).

However, in an embodiment, the header data which is stored for a (and for each) set of data for a group of blocks of the data array solely comprises an indication of the size of the set of data that is stored in the memory for the group of blocks of the data array (and only comprises the indication of the size of the set of data that is stored in the memory for the group of blocks of the data array). This may be particularly the case where, as discussed above, the sets of data for the groups of blocks of the data array are stored in "payload" blocks which are located at predictable memory addresses, and in particular at memory addresses that can be predicted from (that are determined from) the position of a data element and/or of a block or group of blocks in the array.

The header data for the groups of blocks of the data array can be stored in memory in any desired and suitable manner and arrangement. In an embodiment all of the header data for a data array is stored together in a "header buffer" for the stored data array. Thus, plural sets of header data, each indicating the size in memory of a respective set of data for a group of blocks of the data array, are in an embodiment stored together as a header buffer for the data array.

In an embodiment, the header data is arranged as one or more, and in an embodiment plural, header data "blocks" (in an embodiment within a header buffer), with each header data block storing the header data for plural groups of blocks of the data array. In this case therefore, for each set of plural sets of plural groups of blocks of the data array, a "header data block" will be stored, which header data block includes a set of header data for each group of the set of plural groups of blocks of the data array that the header data block relates to. Thus, a header data block in an embodiment includes a plurality of header data fields, one for each group of the set of plural groups of blocks of the data array that the header data block relates to.

In this case, each header data block can store the header data for any desired number of groups of blocks of the data array. In one embodiment, each header data block stores the header data for a set of four groups of blocks of the data array. Other arrangements would, of course, be possible.

In such arrangements, each header data block in an embodiment stores the header data for the corresponding set of plural groups of blocks of the data array in a particular, in an embodiment selected, in an embodiment predefined, block group order, for example in a raster or Morton order across the plural groups of blocks of the data array to which the header data block relates.

Correspondingly the header data blocks are in an embodiment arranged in the memory (e.g. in the header buffer) in a particular, in an embodiment selected, in an embodiment predefined block group order, for example in a raster or Morton order across the plural groups of blocks of the data array to which the header data blocks relate.

In an embodiment, each header data block is of a size that is suitable for (and in an embodiment optimised for) fetching and caching in the data processing system in question. To facilitate this, the header data blocks are in an embodiment a power-of-two number of bits and/or densely packed. Thus, a set of one or more, and in an embodiment a set of plural, the header data blocks in an embodiment corresponds to the amount of data that the data processing system can and will (typically) fetch in a single burst (i.e. to a burst size that the data processing system commonly uses). This then makes the process of fetching the header data blocks "burst friendly". The header data blocks are all in an embodiment the same, fixed, size.

Thus, in an embodiment, for a given data array, a header buffer will be stored, which header buffer stores a plurality of header data blocks, with each header data block storing header data for a plurality of groups of blocks of the data array. Thus each header data block will relate, for example, and in an embodiment, to a "super block" of the data array, which super block will comprise a plurality of groups of plural blocks of the data array, such as four groups, each group comprising a plurality of, e.g. four, blocks of the data array.

Other arrangements would, of course, be possible.

The header data, e.g. header data blocks, can be stored in memory in any desired and suitable manner and arrangement.

In an embodiment, the header data, and in an embodiment the header data blocks, are stored at predictable memory addresses (locations in memory). In an embodiment, they are stored at memory addresses (locations) that can be predicted from (that are determined from) the position of a data element and/or of the data block in the array that the header data relates to. Thus, the storage location (memory address) of each header data block (e.g. within a header buffer having a known location in memory) is in an embodiment dependent upon the position within the data array of the block of the data array that the header data (block) relates to.

In an embodiment, the storage location (memory address) for header data, e.g. a header data block, relative to the start location (address) of the header buffer for a data array, is determined by means of a predetermined function of the relative position of the data block (or data element) within the data array that the header data (block) relates to. In an embodiment, for a data array having vertical and horizontal dimensions xsize and ysize, respectively, and divided into a×b-sized data blocks, and having a header data block size h (in bytes), then if A is the start address of the header buffer in memory, the memory address (location) of the header data block for a given data element of the array (e.g. texel/pixel) at position x, y is given by:

$$\text{header data block address} = A + h^*(x/a + (y^*\text{xsize})/b)$$

A data array can be processed to generate and store the data for the blocks, groups of blocks, and the header data in the manner of the technology described herein in any suitable and desired manner. For example, a suitable processor or processing circuit/circuitry may read the original data array to be stored from memory, and/or receive a stream of data corresponding to the original data array to be stored, and then process the stream of data accordingly, i.e. to divide it into blocks, generate the, e.g. encoded, block data, and then store that data in memory, and generate and store the header data, etc.

For example, an encoder (encoding circuit) could read the data array to be stored from memory and/or receive a stream of data corresponding to the data array to be stored, and then block-wise encode the data array and store the encoded block data for respective groups of blocks, together with appropriate size indications, in memory in the manner of the technology described herein and then generate and store the header data for the groups of blocks correspondingly.

The memory where the header data and the sets of data for the groups of blocks of the data array is stored may comprise any suitable such memory and may be configured in any suitable and desired manner. For example, it may be an on-chip buffer or it may be an external memory (and, indeed, may be more likely to be an external memory). Similarly, it may be dedicated memory for this purpose or it may be part of a memory that is used for other data as well. In an embodiment, this data is stored in main memory of the system that incorporates the processor, such as the graphics processor, that is generating and/or using the data array in question.

In the case of a texture data array, the data is in an embodiment stored in a texture buffer of the graphics processing system (which buffer may, e.g., be on-chip, or in external memory, as desired). Similarly, in the case of a frame for the display, the data is in an embodiment stored in a frame buffer for the graphics processing system and/or for the display that the graphics processing system's output is to be provided to.

The header data and the block and groups of blocks data are in an embodiment stored in the same physical memory, although this is not essential.

Other memory arrangements would, of course, be possible.

Once a data array has been encoded and stored in the manner of the technology described herein, then the stored data array can be, and is in an embodiment, used by a data processor, such as a graphics processor, as desired. For example, in the case where the data array is a graphics texture, the stored graphics texture can be used by a graphics processor to apply textures to fragments that it is rendering for the purposes of producing a render output.

When using a data array that has been stored in the manner of the technology described herein, where separate header data is stored to allow "payload" data to be retrieved, a data processor that is to use (is using) the data array in an embodiment first fetches the separate header data for a required group of blocks of the data array, and then uses that header data to locate and fetch the set of data for the group of the data array that is required. Thus, there will, in effect, be a two-stage fetching process, comprising first fetching the header data, and then fetching the set of data for the group of blocks of the data array itself.

Thus, when using a data array that has been stored in the manner of the technology described herein, a data (e.g. graphics) processor may, and in an embodiment does, first determine the data element(s) or data block of the data array whose value(s) are required, and in an embodiment then operates to load (read) the separate set of "first level" header data for the group of blocks that the data element(s)/data block in question belongs to. The location of the required header data in memory can be determined as desired, but is in an embodiment, as discussed above, determined (at least in part) based on the position of the data element(s)/data block in the data array (at least in the case where the header data for the groups of data blocks of the data array is stored in such an arrangement).

Once the relevant header data for the group of blocks to which the data element(s)/data block that is required belongs has been fetched, the size indication for the stored set of data representing the group of blocks that the desired data element(s)/data block belongs to is in an embodiment read from the header data.

In the case where the header data is stored as respective header data blocks (as discussed above), this process in an embodiment comprises fetching the relevant header data block (e.g., and in an embodiment, based upon the position of the data element or data block whose value is required), and then reading from the fetched header data block, the relevant size indication for the particular group of data blocks that the desired data element/data block belongs to.

The size indication from the header data for the group of blocks that the data element/data block of interest belongs to is in an embodiment then used to fetch the set of data for the group of blocks (including any size indications included in that set of data). In particular, the size of the set of data indicated in the header data for the group of data blocks is in an embodiment used to determine the location of the set of data for the group of blocks in memory, e.g., and in an embodiment, by adding the size indication to a start memory location for the set of data for the group of blocks in question, to thereby determine the memory address range that should be fetched to fetch the set of data for the group of blocks.

The start memory address for the set of data for a group of blocks can be determined as desired. This may, and in an embodiment does, depend, as discussed above, on how the sets of data for the groups of blocks for the data array are arranged in the memory. For example, it could be based on pointer or other data that is indicative of a base, e.g., start, location (a base, e.g. start, address) in memory where the set of data for the group of blocks that the header relates to is stored, with the locations of the individual sub-blocks then being derived from that base, e.g., start, memory location.

As discussed above, in an embodiment, the start address for a set of data for a group of blocks is determined based on (and dependent on) the location of the group of blocks in question in the data array. Thus, in an embodiment, the process determines the start address for the set of data for a group of blocks that is to be fetched for determining the value of a desired data element/data block based on the (relative) position of the desired data element/data block in the data array (and determines the end address of the set of data to be fetched based on the size indication given in the separate set of header data for the group of blocks in question).

Once the set of data for the group of blocks that includes the data element(s)/data block of interest has been fetched, then in an embodiment, the data for the data block that contains the data element(s) of interest in the set of data for the group of blocks is identified. The data for the data block containing the data element(s) of interest can then be extracted from the set of data for the group of blocks and used to determine a data value for the particular data element or elements of interest.

Identifying the data for the data block that contains the data element(s) of interest in the set of data for the group of blocks in an embodiment uses the overall set of data size indication included in the separate header data together with, if present, the individual block size indications included with the set of data for the group of blocks.

In the case where the separate header data indicates that the blocks have been stored in an uncompressed form (such that the set of data for the group of blocks in an embodiment does not include any individual block size indications), then the data for the data block of interest in the set of data for the group of data blocks is in an embodiment identified based on the known size of an uncompressed data block, together with the (known, predefined) order in which the data blocks are stored in the set of data for the group of data blocks.

In the case where the set of data for the group of blocks that includes the data element/data block of interest does include one or more individual block size indications (and so the separate header data for the group of blocks will indicate the size of the overall set of data that has been stored for the group of blocks), then in an embodiment, the individual block size indications in the set of data for the group of blocks are in an embodiment first read (decoded). The block size indications are, as discussed above, in an embodiment stored in a particular, in an embodiment selected, in an embodiment predefined, location in the sets of data for the groups of blocks, to facilitate this. The individual block size indications are in an embodiment then used, optionally (and if necessary) together with the overall set of data size indication included in the separate header data, to identify the data for the data block that contains the data element(s) of interest in the set of data for the group of blocks.

In the case where the set of data for the group of blocks includes an individual block size indication for each block in the group of blocks, then those individual block size indications can be, and are in an embodiment, used, in an embodiment without the overall set of data size indication, to identify the data for the data block of interest in the set of data for the group of blocks. For example, and in an embodiment, the individual block size indications (together with, e.g., the known size of the individual block size indications included in the set of data for the group of blocks) are used to determine the location of the data for a given block in the group of blocks (e.g., and in an embodiment, by adding the relevant sizes to the start address for the set of data for the group of blocks). Thus, for example, if the second block is required, its location (the location of its data) will be derived, for example, by adding the size of the individual block size indications (if they precede the individual block's data) to the indicated size of the first block, to determine the start location for the data for the second block, with the indicated size of the second block then being used to determine the end location for the data for the second block.

In the case where the set of data for the group of blocks includes individual block size indications for, e.g., all except one of the block of the groups of blocks, then the individual block size indications (and the size of those individual block size indications) can be used in the above manner to determine the location of the data for the individual blocks, save that in the case where no size indication is provided for the final block in the group of blocks, the overall set of data size indication included in a separate header would then be used to determine the end of the data for the final block in the group (i.e. the size of the final block is determined as the total size of the group minus the sizes of the other blocks in the group).

Other arrangements would, of course, be possible.

Once the data for the data block containing the data elements of interest has been identified, the data for that data block can then be, and is then in an embodiment, extracted from the set of data for the group of blocks, and used to determine a data value or values for the particular data element or elements of interest. The data value(s) for the particular data element or elements of interest can be determined in any suitable and desired manner, for example depending upon whether the data for the blocks has been encoded (e.g. compressed) or not.

In the case where the data for the data block stores the data element values themselves, then the relevant data element value can be identified and extracted. In the case where the data values for the data elements of the data block are stored in an encoded (e.g. compressed) form, then the data for the data block can be appropriately decoded/decompressed (e.g. sent to an appropriate decoder) to allow the data value for the particular data element(s) of interest to be determined.

The technology described herein also extends to the process of reading (and decoding) data that has been stored in the manner of the technology described herein.

Thus, another embodiment of the technology described herein comprises a method of determining the value of a data element of a stored data array in a data processing system, the method comprising:

determining the memory location of stored header data for a group of blocks of the data array that the data element falls within;

reading the header data and determining therefrom an indication of the total size in memory of a stored set of data for the group of blocks of the data array that the data element falls within;

using the determined indication of the total size in memory of the stored set of data for the group of blocks from the header data for the group of blocks that the data element falls within to fetch the stored set of data for the group of blocks;

extracting a set of header data from the set of data for the group of blocks and determining therefrom a size indication for each of one or more of the blocks of the group of blocks, the size indication for a block of the group of blocks indicating the size in memory of a set of data for that block of the group included in the stored set of data representing the group of blocks;

using the determined size indication for at least one of the blocks of the group of blocks, to extract the set of data for the data block containing the data element whose value is required from the set of data for the group of blocks; and using the extracted set of data for the data block containing the data element whose value is required to determine a data value for the data element whose value is required.

Another embodiment of the technology described herein comprises an apparatus for determining the value of a data element of a stored data array in a data processing system, the apparatus comprising:

a header data retrieving circuit configured to:

determine the memory location of stored header data for a group of blocks of the data array that the data element falls within; and read the header data and determine therefrom an indication of the total size in memory of a stored set of data for the group of blocks of the data array that the data element falls within;

a data extracting circuit configured to:

use the determined indication of the total size in memory of the stored set of data for the group of blocks from the header data for the group of blocks that the data element falls within to fetch the stored set of data for the group of blocks;

extract a set of header data from the set of data for the group of blocks and determine therefrom a size indication for each of one or more of the blocks of the group of blocks, the size indication for a block of the group of blocks indicating the size in memory of a set of data for that block of the group included in the stored set of data representing the group of blocks; and use the determined size indications for at least one of the blocks of the group of blocks, to extract the set of data for the data block containing the data element whose value is required from the set of data for the group of blocks;

and a decoding circuit configured to:

use the extracted set of data for the data block containing the data element whose value is required to determine a data value for the data element whose value is required.

As will be appreciated by those skilled in the art, these embodiments of the technology described herein can, and in an embodiment do, include any one or more or all of the features of the technology described herein described herein, as appropriate.

Thus, for example, the data processing system is in an embodiment a graphics processing system, and the data array is in an embodiment a graphics texture (in which case the data element is in an embodiment a texel), or a frame for display (in a frame buffer) (in which case the data element is in an embodiment a pixel or a sampling position), etc. Similarly, the apparatus for determining the value of a data element of a stored data array in a data processing system is in an embodiment incorporated in a graphics processor or a display controller.

Similarly, the location of the required header data in memory is in an embodiment, as discussed above, determined (at least in part) based on the (relative) position of the data element(s)/data block in the data array (at least in the case where the header data for the groups of data blocks of the data array is stored in such an arrangement).

Correspondingly, the size indication for the set of data indicated in the header data for the group of data blocks is in an embodiment used to fetch the set of data for the group of blocks by using that size indication to determine the location of the set of data for the group of blocks in memory, e.g., and in an embodiment, by adding the size indication to a start memory location for the set of data for the group of blocks (which could be based, for example, on pointer or other data that is indicative of a base, e.g., start, location (a base, e.g. start, address) for the set of data for the group of blocks, and/or determined based on (and dependent on) the position of the desired data element in the data array), to thereby determine the memory address range that should be fetched to fetch the set of data for the group of blocks.

Similarly, the individual block size indications in the header data that is included in the set of data for the group of blocks are in an embodiment used, in an embodiment together with the overall set of data size indication included in the separate header data, to identify (and thereby extract) the data for the data block that contains the data element of interest in the set of data for the group of blocks.

Correspondingly, in an embodiment, the separate header data can indicate that the blocks of a group of blocks have been stored in an uncompressed form, and in that case, the data for the data block of interest in the set of data for the group of data blocks is identified based on the known size of an uncompressed data block, together with the (known) order in which the data blocks are stored in the set of data for the group of data blocks.

The technology described herein also extends to a method and system that both stores and then reads the data for the data array in the manners discussed above.

The methods and apparatus of the technology described herein can be implemented in any appropriate manner, e.g. in hardware or software, and in (and be included in) any appropriate device or component.

The actual device or component which is used to store the data in the manner of the technology described herein will, for example, depend upon the nature of the data array that is being stored. Thus, for example, in the case of a graphics texture, an appropriate processor, such as a personal computer, may be used to generate and store the textures in the manner of the technology described herein, e.g. by an application developer, and the so-stored textures then provided as part of the content of a game, for example. In the case of the stored data array being a frame for display, then it may accordingly be a graphics processor that generates and stores the data in the manner required.

Similarly, on the data reading (decoding) side of the operation, in the case of texture data, for example, it will be a graphics processor that reads (decodes) the stored data array, and in the case of a frame for display, it could be a display controller for a display that reads (decodes) the stored data array.

In an embodiment the technology described herein is implemented in a graphics processor, a display controller, an image signal processor, a video decoder or a video encoder and thus the technology described herein also extends to a graphics processor, a display controller, an image signal processor, a video decoder or a video encoder configured to use the methods of the technology described herein, or that includes the apparatus of the technology described herein, or that is operated in accordance with the method of any one or more of the embodiments of the technology described herein described herein. Subject to any hardware necessary to carry out the specific functions discussed above, such a graphics processor, display controller, image signal processor, video decoder or video encoder can otherwise include any one or more or all of the usual functional units, etc., that graphics processors, display controllers, image signal processors, video decoders or video encoders include. In an embodiment, the methods and apparatus of the technology described herein are implemented in hardware, in an embodiment on a single semi-conductor platform.

The technology described herein is particularly, but not exclusively, suitable for use in low power and portable devices. Thus, in an embodiment, the technology described herein is implemented in a portable device, such as a mobile telephone or PDA.

As will be appreciated by those skilled in the art, the technology described herein will typically be implemented in a data processing system that will include one or more data processors, such as a graphics processor that will store and/or use data arrays in the manner of the technology described herein, e.g., and in an embodiment, together with a host processor (e.g. CPU) that, e.g., executes applications that require processing of data arrays by the data, e.g. graphics, processor(s), and/or a display for displaying images generated by the data, e.g. graphics, processor. Thus, the, e.g. graphics, processor may be, and is in an embodiment, in communication with a host microprocessor (e.g. CPU), and/or with a display for displaying images based on data generated by the, e.g. graphics, processor.

The data, e.g. graphics, processor and/or system may also comprise, and/or be in communication with, one or more memories and/or memory devices that store the data described herein, and/or the output data generated by the, e.g. graphics, processor, and/or store software for performing the processes described herein.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (circuits/circuitry) and/or programmable hardware elements (circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

FIG. 1 shows schematically the way that an array of original data 20 is stored in an embodiment of the technology described herein.

The array of original data 20 is a two-dimensional data array containing a plurality of data elements (containing data entries at a plurality of particular positions within the array). The data array 20 could be any suitable and desired array of data, but in a graphics processing context, it could, for example, be a texture map (i.e. an array of texture elements (texels)), or an array of data representing a frame to be displayed (in which case the data array may be an array of pixels to be displayed). Each data entry (position) in the data array will represent an appropriate, e.g. texel or pixel, value (e.g. a set of colour values, such as RGBa, or luminance and chrominance, values for the texel or pixel).

As shown in FIG. 1, to store the data array 20 in memory, the data array 20 is divided into a plurality of non-overlapping, equal-size and uniform, "super blocks" 21, each super block 21 corresponding to a particular region of the data array 20. In the present embodiment, each super block 21 of the data array corresponds to a block of 16×16 elements (positions) within the data array 20 (i.e. a block of 16×16 texels in the case of a texture map). Other arrangements would, of course, be possible.

Each super block 21 is further sub-divided into a set of sixteen non-overlapping, uniform and equal-size blocks 22. In the present case, as each super block 21 corresponds to 16×16 elements (positions) within the data array, each block 22 accordingly corresponds to a 4×4 data element region within the super block 21 (e.g. 4×4 texels in the case of a texture map). (FIG. 1 only shows the division of a few of the super blocks 21 of the data array 20 into blocks 22 for simplicity. However, each and every super block 21 that the original data array 20 is divided into is correspondingly sub-divided into a set of plural blocks 22 for encoding purposes.)

As shown in FIG. 1, the individual blocks 22 within each super block 21 are organised into respective non-overlapping 2×2 groups of blocks, that thereby form respective 2×2 block groups 30. (As each super block 21 corresponds to 16×16 elements (positions) within the data array, each block group 30 accordingly corresponds to an 8×8 data element region within the super block 21.)

To store the data array 20 in memory, as shown in FIG. 1, a set of "payload" data 32 is stored for each 2×2 group of blocks that the data array 20 is divided into. This set of payload data 32 includes, as shown in FIG. 1, for each block 22 of the 2×2 group of blocks that the set of payload data 32 corresponds to, a set of data 27 representing the data values of the block 22 (from which the data values of the data elements of the block can be determined). The sets of data 27 representing each individual block in the groups of blocks are stored in a particular, predefined, order, in each set of payload data 32.

In the present embodiment, the original data array 20 is encoded and compressed before it is stored, so the data 27 that is stored in respect of each block 22 will be an encoded (compressed) representation of the data block 22 (and from which the original data elements of the block (or at least a desired approximation to the value of those data elements (e.g. where a lossy encoding (compression) scheme is being used)) can be derived).

Any suitable and desired encoding (compression) process can be used for this encoding. In the present embodiment, the encoding scheme is such that a given data block can be decoded in its entirety using the stored set of data 27 for the block (and independently of any other block and of the data for any other block).

In the present embodiment, as well as a (and each) payload set of data 32 storing a set of data 27 for each block 22 of the group of blocks 30 that the payload set of data 32 corresponds to, a (and each) payload set of data 32 also stores a "second level" header 28 for the 2×2 group of blocks 30 in question. This "second level" header 28 is stored in a fixed sized field at the start (in this embodiment but in practice at any desired (and in an embodiment predefined) position, in the set of data)) of the payload set of data 32 for the group of blocks.

Each "payload" second level header 28 stores, as shown in FIG. 1, a size indication 29 for all except the last block of the 2×2 group of blocks that the payload set of data 32 stores data for. The size indication 29 for a block 22 that is stored in the second level, payload, header 28 indicates the size in bytes of the set of data 27 that is stored for the block in question in the payload set of data 32.

The payload sets of data 32 for the 2×2 groups of blocks are stored, as shown in FIG. 1, in respective payload "blocks" 25 in a payload buffer 26 in memory. Each payload block 25 is stored at an address-aligned starting position in the payload buffer 26, and has a capacity to store the data for a 2×2 group of blocks of the data array in an uncompressed form.

(Thus, as shown in FIG. 1, if the payload set of data 32 for a 2×2 group of blocks does not fill the payload block 25 in question, the payload block 25 is padded with dummy data 33 to the appropriate aligned address. The effect of this use of address aligned (and padded) payload blocks is that the memory allocation size for the compressed data array 20 will be exactly the same as if the data array was stored in an uncompressed form. However, the present embodiment will still result in reduced bandwidth when using the stored data array, for example, because, as will be discussed further below, the processor that is using the data array will only read and process the "useful" data in each payload block 25.)

In the present embodiment, the (address-aligned) start position that each payload data block 25 is stored at within the payload buffer 26 is determined from (predicted from) the position within the data array of the 2×2 payload group of blocks 30 that the payload block 25 relates to (stores the set of data 32 for). In particular, the address of the payload block 25 in the payload buffer 26 for a data array element (e.g. texel or pixel) at a position x, y within the data array 20 is given by:

$$\text{payload block address}=A+n*(x/8+(y*\text{xsize}/8)$$

where A is the start address of the payload buffer, xsize and ysize are the vertical and horizontal dimensions, respectively, of the data array 20, and it is assumed that the data array 20 is divided into groups of blocks comprising 8×8 data elements and each payload block occupies n bytes. (The start address A for the payload buffer 26 can be indicated as desired, for example by means of separate metadata, such as a descriptor, that is provided for the data array.)

As well as storing a "second level" header 28 in each payload set of data 32 for each 2×2 group of blocks 30 that the data array is divided into for storing purposes, in the technology described herein, a respective "first level" header 31 is stored in a separate, "first level headers" header buffer 24, for each 2×2 "payload" group 30 of blocks 22 that the original data array 20 is divided into.

These separate headers 31 are stored as respective header data blocks 23 in the header buffer 24, with each header data block 23 in the header buffer 24 storing, as shown in FIG. 1, a respective "first level" header 31 for each of the four 2×2 block groups 30 of a respective superblock 21 of the data array 20. Thus, each header data block 23 includes four first level "block group" headers 31 (which are stored in a particular, predefined, block group order) (and a separate header data block 23 is stored for each super block 21 that the data array 20 has been divided into).

FIG. 1 shows the positions of the header data blocks 23 in the header buffer 24 for some of the super blocks 21 that the data array 20 is divided into. Each super block 21 that the data array 20 is divided into has a corresponding header data block 23 in the header buffer 24.

The header buffer 24 starts at a start address A in memory, and the header data blocks 23 are each stored at a predictable memory address within the header buffer 24.

In particular, the position that each header data block 23 is stored at within the header buffer 24 is determined from (predicted from) the position within the data array of the super block 21 that the header data block 23 relates to. In particular, the address of the header data block 23 in the header buffer 24 for a data array element (e.g. texel or pixel) at a position x, y within the data array 20 is given by:

$$\text{header data block address}=A+n*(x/16+(y*\text{xsize}/16)$$

where A is the start address of the header buffer, xsize and ysize are the vertical and horizontal dimensions, respectively, of the data array 20, and it is assumed that the data array 20 is divided into 16×16 super blocks and each header data block occupies n bytes. (The start address for the header buffer 24 can again be provided as desired, for example as metadata (e.g. in the form of a descriptor) for the data array.)

In the present embodiment, each header data block 23 in the header buffer 24 has the same, fixed size, that is smaller than the burst-size used by the data processing system in which the stored data array is to be used, but such that a (single) burst will contain a set of $2^n$ full headers. This means that the header data blocks 23 are of a size that is suitable for fetching using "system-friendly" bursts.

The "first level" header 31 for a 2×2 block group 30 of the data array 20 that is stored in a header block 23 stores an indication 34 of the total size in bytes of the set of data 32 that has been stored for the 2×2 block group 30 that the header 31 relates to.

(Thus the header 31 for a given 2×2 block group 30 of the data array will indicate in bytes the size of the "useful" set of data 32 that has been stored for that 2×2 block group 30 of the data array (i.e. comprising the size of the second level header 28 and of the four sets of individual block data 27 for the 2×2 block group 30 in question (but excluding any "dummy", padding data 33 that has been included in the payload block 25 in question).)

The header buffer 24 and payload buffer 26 may be stored in any suitable memory of the data processing system in question. Thus, for example, they may be stored in an on-chip memory or in an external memory, such as a main memory of the data processing system. They are in an embodiment stored in the same physical memory, but that is not essential.

Some or all of the header buffer and payload blocks could also be copied to a local memory (e.g. cached), in use, if desired.

In operation to encode a data array 20 in the manner of the present embodiment, a suitably configured and/or programmed processing circuit will receive and/or fetch from memory a stream of data representing the original data array 20, and operate to divide the data array 20 into blocks, group of blocks and super blocks as discussed above, generate appropriate header data blocks and store those blocks in a header buffer 24, and generate encoded versions of the blocks of the data array and store data for those encoded versions of the blocks of the data array in payload blocks in a payload buffer 26 in memory.

Figure 2:
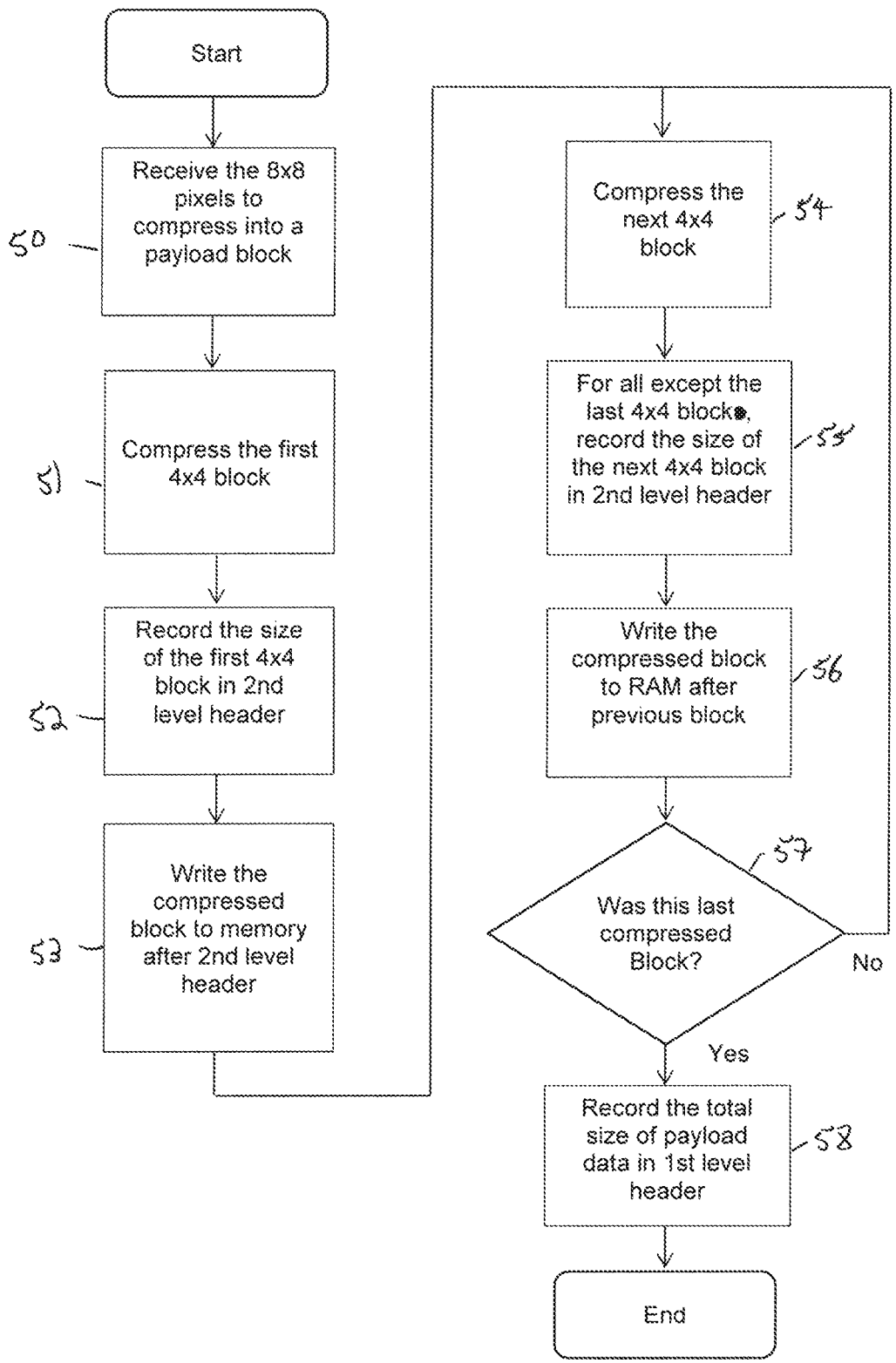
FIG. 2 shows schematically the encoding and storing an array of data in an embodiment of the technology described herein.

FIG. 2 illustrates this and shows a flowchart showing an embodiment of the encoding process.

As shown in FIG. 2, to generate the set of payload data 32 for a given 2×2 group of blocks 30 of the data array being encoded, the encoder will first receive the 8×8 pixels corresponding to the 2×2 group of blocks 30 that are to be compressed into a payload set of data and stored in a payload block 25 (step 50).

The encoder will then compress the first 4×4 block of the 2×2 group of blocks (step 51), and record the size of the compressed set of data generated to represent the first 4×4 block in the first "size" field (entry) in the second level header 28 of the payload set of data 32 in question (step 52).

The encoder will then write the compressed block into the payload block 25 in question immediately after the second level header 28 in that block (step 53).

The encoder will then compress the next 4×4 block of the 2×2 group of blocks (in the particular, predefined, block encoding order) (step 54), and, if the 4×4 blocks is not the last block of the 2×2 group of blocks, record the size of the compressed set of data for that next 4×4 block in the next entry in the second level header 28 in the payload block (step 55), and then write the compressed block into the payload block 25 immediately after the set of data 27 for the previous block (step 56).

This will then be repeated until each block of the 2×2 group of blocks 30 has been encoded (compressed) and stored with a corresponding second level header entry (except for the last block) in the payload block 25 (step 57). (For the last block of the 2×2 group of blocks, step 55 will be omitted and the compressed block will simply be written into the payload block 25 immediately after the set of data 27 for the previous block (step 56).)

Once the payload set of data 32 for the 2×2 group of blocks 30 has been stored in the appropriate payload block 25, then, as shown in FIG. 2, the encoder operates to store the corresponding first level header 31 in the appropriate header data block 23 in the header buffer 24 indicating the total size of the payload set of data 32 for the 2×2 group of blocks 30 in question (step 58).

The process will then be repeated for the next 2×2 group of blocks of the data array, and so on, until the entire data array has been encoded.

The above primarily describes the way that the data array is processed and stored in memory for use in the present embodiment.

When the so-stored data array comes to be used, for example to apply to fragments to be rendered (where the stored data array is a texture map for use in graphics processing), then the reading and decoding process for the stored data array will essentially comprise the reverse of the above storing and encoding process.

Figure 3:
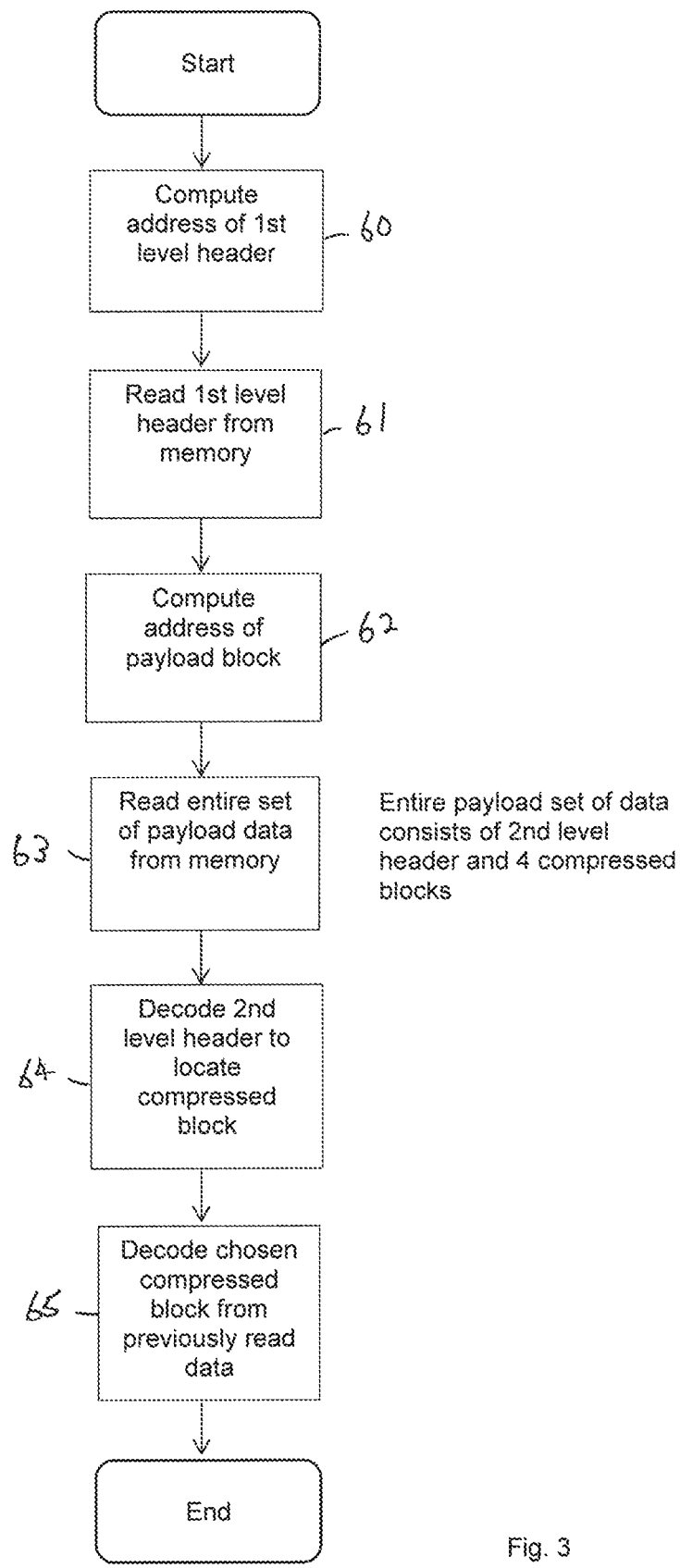
FIG. 3 shows schematically the decoding of a stored encoded array of data in an embodiment of the technology described herein.

FIG. 3 illustrates this and shows a flowchart of an embodiment of the decoding process.

When decoding the stored data array, the position(s) of the particular data element or elements in the data array that are of interest (i.e., whose values are to be determined) will first be determined.

Then, as shown in FIG. 3, to determine the value of the data element (data position) of a data array that has been encoded and stored in the manner of the technology described herein, the decoder first determines the address of the "first level" header data block 23 that relates to the super block 21 that the data element of interest belongs to (step 60).

As discussed above, the address of the first level header block 23 in question is determined from the position within the data array of the data element of interest, and the start address A of the header buffer 24 for the data array (if necessary, this can be communicated to the decoder e.g. in the form of metadata and/or by the, e.g., software that controls the encoder and decoder setting a control register with a pointer to the header buffer 24). The decoder uses the start address together with the position of the data array element or elements that are of interest to determine the location of the header data block for the block of the data array that the data element(s) falls within in the manner discussed above.

The identified first level header data block 23 is then read from the memory, and the size indication header data 31 for the 2×2 group of blocks 30 to which the data element of interest belongs is determined from that header data (step 61).

The start address of the payload block 25 that stores the set of data for the 2×2 group of blocks 30 that contains the data element of interest is then determined (step 62). As discussed above, the memory address of the payload block 25 in question is determined, in the present embodiment, based on the position within the data array of the data element of interest and the start address A of the payload buffer 26 for the data array (if necessary, this can be communicated to the decoder by the, e.g., software that controls the encoder and decoder setting a control register with a pointer to the payload buffer). The decoder uses the start address together with the position of the data array element or elements that are of interest to determine the start location of the payload block for the group of blocks of the data array that the data element(s) of interest falls within.

The entire set of payload data 32 for the 2×2 group of blocks of interest is then read from the identified payload block 25 in the payload buffer 26 (step 63). To do this, the decoder uses the total size indication for the payload set of data 32 from the first level header 31 to identify the memory address range that must be read in this regard (by adding that size to the start address for the payload block 25).

As illustrated in FIG. 1, the entire payload set of data that is read from the memory comprises the second level header 28 and the four (in this embodiment) sets of data 27 for the four blocks of the 2×2 group of blocks 30 that the payload set of data relates to. As the first level headers 31 store the size of the full payload set of data 32 including the second level header 28, the decoding hardware unit can read the full set of payload data 32 from memory, using the total size indication for the payload set of data 32 from the first level header 31 to identify the memory address range that must be read in this regard.

It should be noted here that the entire payload set of data (including the second level header 28 and the four compressed data blocks) is read at once after the first level header has been decoded. This avoids further reads from memory.

Once the entire set of payload data has been read from the memory, the individual block size indications in the second level header 28 in the payload set of data 32 are decoded and used to locate the set of data 27 for the data block of interest (containing the data element whose value is required) in the set of payload data 32 for the 2×2 group of blocks (step 64).

In order to locate the data for an individual 4×4 block 22, it is necessary for the decoder to be able to determine the location of the data for the individual 4×4 blocks 22 within the overall set of data 32 for the group of blocks 30 in question. This is achieved in the present embodiment by using the sizes of the stored data for each respective 4×4 block 22 included in the second level headers 28 in the payload blocks 25.

To locate the data for an individual 4×4 block in the set of data 32 for the group of blocks 30 that the block belongs to, the decoder uses the (known) size of the second level header 28, together with the individual block size indications in the second level header 28 to sum the sizes of the stored data for the second level header and any 4×4 blocks that are stored prior to the 4×4 block of interest, to determine the start position for the data for the block 22 of interest in the set of data 32 for the group of blocks 30 that the block belongs to. The end position of the data for the block of interest is correspondingly determined using the indicated stored data size for the block in question, or by reaching the end of the set of data 32 for the group of blocks 30 that the block belongs to, in the case of the last block of the group.

The set of data for the block of interest is then decoded and used to determine the data value for the data element or elements of interest (step 65).

The determined data values can then be used as desired, e.g. as texel values for use when applying a texture in graphics processing, or as pixel values when displaying a frame, etc.

This process is repeated for each data element of interest (whose value is required).

Various modifications and alternatives to the above described encoding and decoding arrangements could be used if desired.

For example, the encoding process could be operable to determine whether the compressed (encoded) versions of the four blocks in a payload set of data exceeds the size of the uncompressed input data for that 2×2 group of blocks, and in that case, instead store the 2×2 group of blocks in a payload block in an uncompressed form (i.e. so that the data stored in the payload set of data for the group of blocks is an exact copy of the uncompressed input data for that group of blocks), with this "uncompressed" payload block situation then being indicated, for example, and in an embodiment, by storing a special (a predefined) value in the corresponding first level header data 31 for the 2×2 group of blocks in question.

Figure 4:
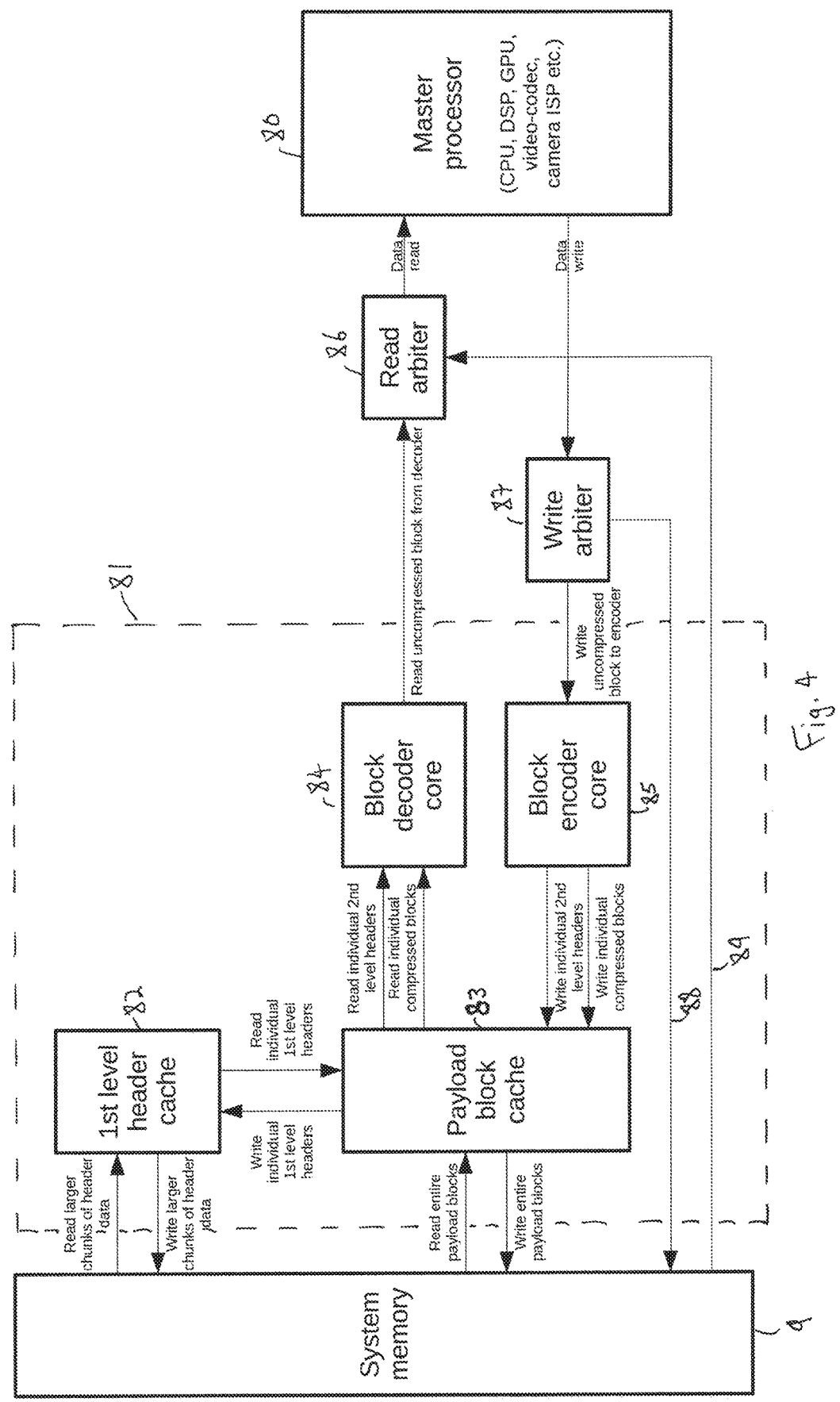
FIG. 4 shows schematically an encoder/decoder of an embodiment of the technology described herein.

FIG. 4 shows an exemplary embodiment of a codec (coder/decoder) 81 that can encode and decode data arrays in the manner of the present embodiments.

The codec 81 is shown in FIG. 4 as being a standalone hardware codec 81 that interfaces between a "master" processor, such as a CPU, DSP, CPU, video-codec, camera ISP, neural network processor, etc., that is using a data array, and the system memory 9 where the data array will be stored. The hardware codec 81 could, for example, be integrated as part of the memory system, if desired. In other arrangements, the hardware codec 81 could be part of the processor, such as CPU or GPU that is actually using the data arrays, if desired.

In the arrangement shown in FIG. 4, the hardware codec 81 operates such that the master processor using the data array will only see the uncompressed version of the data array. There could be one or many master processors connected to the same codec 81. The master processors 80 will read from and write to the data array as if it was uncompressed, with the codec 81 performing all the necessary encoding/decoding operations.

As shown in FIG. 4, the codec 81 comprises four main processing units, a first level header cache 82, a payload block cache 83, a block decoder circuit 84, and a block encoder circuit 85.

The first level header cache 82 has cache lines containing multiple first level headers such as 512-bit cache lines. A full cache line's worth of data is read from or written to the system memory 9 by this cache.

The payload block cache 83 has cache lines containing one set of payload data 32 each. Each cache line is large enough to hold an entire payload block 25.

The block decoder circuit 84 performs the decoding (decompression) of the compressed (encoded) data. The block encoder circuit 85 correspondingly performs the encoding (compression) of data to be written to the encoded data array in the memory 9.

The codec 81 interfaces with the master processor that is using the data array via a read arbiter 86 and a write arbiter 87. The read arbiter 86 and the write arbiter 87 determine whether a memory read or write request from a master processor 80 is to an encoded data array (a data array that has been/is being encoded in the manner of the present embodiment), and, in that case, routes the request to the codec 81. On the other hand if the read or write request is not to a data array that has been encoded/is being encoded in the manner of the technology described herein, the relevant arbiter routes that request directly 88, 89 to the memory system 9, bypassing the codec 81.

It will be appreciated that each of the stages, elements, units, etc., of the codec 81 shown in FIG. 4 may be implemented as desired and will accordingly comprise, e.g., appropriate circuits/circuitry, and/or processing logic, programmable logic, programmable circuits/circuitry, etc., for performing the necessary operations and functions, and will provide the appropriate control and processing circuits/circuitry, etc., for performing the present embodiments.

In the present embodiment, the operation of this system in the case of a read transaction is as follows.

When a master processor 80 issues a memory read request, the read arbiter 86 will recognise that the read is from an encoded data array and accordingly route the read request to the codec 81 and in particular to the block decoder circuit 84 of the codec 81. The block decoder circuit 84 will then issue a block read request to the payload block cache 83.

The payload block cache 83 will then check if the payload set of data 32 that includes the required data block is already in the payload block cache. If the data for the block is in the cache, the requested encoded block is extracted from the relevant payload set of data 32 (in the manner discussed above), and the data for the compressed block is returned to the block decoder circuit 84 for decoding.

On the other hand, if the requested data block is not present in the payload block cache 83, the payload block cache 83 will request a read of the first level header for the group of blocks in question from the first level header cache 82.

In response to this request, if the relevant first level header is in the first level header cache 82, then the first level header is returned to the payload block cache 83.

On the other hand, if the first level header is not in the first level header cache 82, the first level header cache 82 will request a read of a cache line's worth of header data blocks from the system memory 9 which will contain the requested first level header. After the requested header data returns from the system memory 9 (which will be after some delay), the relevant first level header is then be returned to the payload block cache 83.

Once the payload block cache 83 has the first level header for the group of blocks in question, it will use that header to determine (as discussed above) how much data to read from the system memory 9 for the payload set of data for the group of blocks in question.

The payload block cache 83 will then allocate a new cache line for the new payload set of data, and send a memory request to the system memory 9 to read the payload set of data from the relevant payload block in memory. The payload set of data will then be returned from the system memory 9 (after some delay) and so be present in the payload block cache 83.

The requested compressed individual data block can then be extracted from the set of payload data for the group of blocks in question (in the manner discussed above), and the block data returned to the block decoder circuit 84 for decoding.

The block decoder circuit 84 will then decode (decompress) the compressed block and return the decompressed data to the read arbiter 86, which will then forward the decompressed data to the requesting master processor 80.

In the case of a write operation (i.e. when a master processor is wishing to store a data array in the manner of the technology described herein in the memory 9), the operation is as follows.

In this case, the master processor will generate successive (a sequence) of blocks of a data array to be encoded (as illustrated in FIG. 1), and will send successive blocks of the data array, as they are generated, in the appropriate block order, to the codec 81 to be appropriately encoded and stored.

When a block of the data array is ready to be encoded and stored, the master processor 80 will issue a memory write request which will be recognised by the write arbiter 87 as being a write to an encoded data array, and so route the write request to the block encoder circuit 85. The block encoder circuit 85 will then encode (compress) the block of the data array that is to be written in the appropriate manner, and send it to the payload block cache 83.

The payload block cache 83 will then check if a cache line in the payload block cache 83 has already been allocated for the group of data blocks that the data block in question belongs to. If a cache line for the group of blocks (for the payload set of data) in question is already allocated in the payload block cache 83, then the newly compressed data block is written into the appropriate location in the allocated payload block cache line and the appropriate size indication is written to the second level header in the payload set of data in the cache line, as appropriate.

On the other hand, if there is not an already allocated cache line in the payload block cache 83 for the payload data for the group of blocks in question, then the payload block cache 83 will first allocate a cache line for the payload set of data for the group of blocks in question (after evicting an existing cache line if necessary), and then write the newly compressed data block into the appropriate location in the newly allocated payload block cache line and the appropriate size indication to the second level header in the payload set of data in the cache line, as appropriate. (This may typically happen when the first block of a new group of blocks is to be encoded and stored, as in that case there will not be an existing payload set of data for the new group of blocks in the payload block cache 83.)

Once the complete payload set of data for a group of blocks being encoded has been written into the payload block cache 83, the payload block cache 83 will correspondingly issue a write request to the first level header cache 82, so as to write the relevant first level header data (size indication) for the newly completed payload set of data to the first level header cache 82.

Again, the first level header cache 82 will first check if a cache line in the first level header cache 82 has already been allocated for the header data for the group of data blocks in question. If a cache line for that group of blocks is already allocated in the first level header cache 82, then the first level header data (size indication) for the set of payload data for the group of blocks in question is written into the appropriate location in the allocated first level header cache line.

On the other hand, if there is not an already allocated cache line in the first level header cache 82 for receiving the first level header data for the group of blocks in question, then the first level header cache 82 will first allocate a cache line for the first level header data for the group of blocks in question (after evicting an existing cache line if necessary), and then write the first level header data for the group of blocks into the appropriate location in the newly allocated first level header data cache line.

Once the complete set of payload data for a group of blocks of the data array has been stored in a cache line of the payload block cache 83, and the corresponding first level header data has been stored in the first level header cache 82, then the set of payload data can be written back to the appropriate location (payload block 25) in the payload buffer 26 in the system memory 9 from the payload block cache 83. This may be done immediately the set of payload data is complete, and/or in response to some event, such as a need to evict the cache line in question for some reason.

Correspondingly, once a cache line of the first level header cache 82 is complete with header data for respective groups of the data array, then that cache line can correspondingly be written back to the system memory 9 (at the appropriate location in a header buffer in the system memory). Again, this can either be done immediately or in response to some, e.g. eviction, event.

This process will be repeated to store respective sets of payload data and first level header data for the respective groups of blocks that the data array being encoded and stored is divided into.

Figure 5:
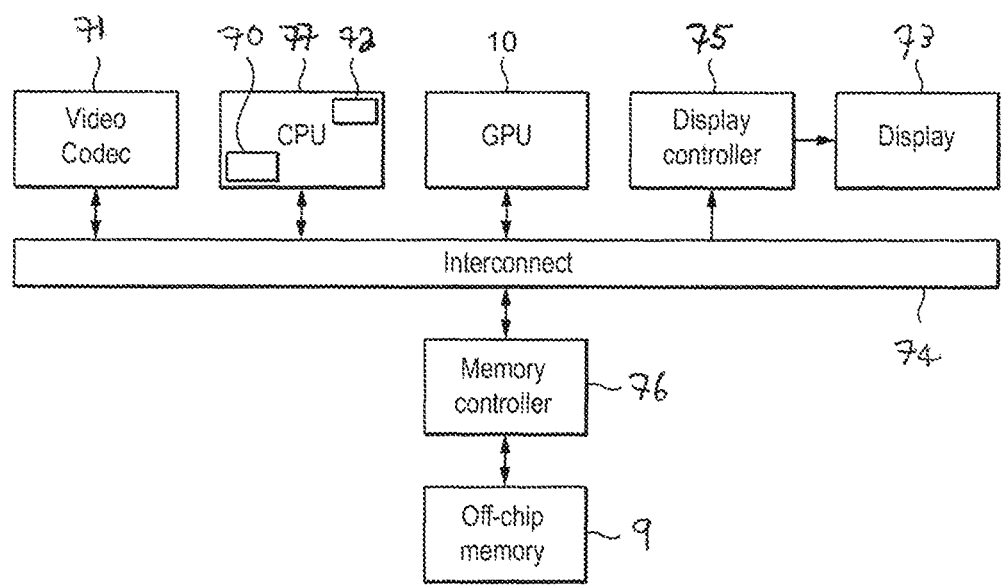
FIG. 5 shows schematically a data processing system that may use data arrays stored in accordance with the technology described herein.

FIG. 5 shows an exemplary data processing system in which the technology described herein and the present embodiment may be implemented.

The exemplary data processing system shown in FIG. 5 comprises a host processor comprising a central processing unit (CPU) 77, a graphics processing unit (GPU) (graphics processor) 10, a video codec 71, a display controller 75, and a memory controller 76. As shown in FIG. 5, these units communicate via an interconnect 74 and have access to off-chip memory 9. In this system the GPU 10, video codec 71, and/or a CPU 77 will generate frames (images) to be displayed, and the display controller 75 will then provide the frames to a display 73 for display.

In use of this system, an application 70, such as a game, executing on the host processor (CPU) 77, will, for example, require the display of frames on the display 73. To do this, the application 70 will submit appropriate commands and data to a driver 72 for the graphics processor 10 that is executing on the CPU 77. The driver 72 will then generate appropriate commands and data to cause the graphics processor 10 to render appropriate frames for display and to store those frames in appropriate frame buffers, e.g. in the main memory 90. The display controller 75 will then read those frames into a buffer for the display from where they are then read out and displayed on the display panel of the display 73.

In this arrangement, the video codec 71, CPU 77, GPU 10 and display controller 75 may, for example, act as master processors that use a hardware codec 81 as discussed above that is present, for example, in the memory controller 76, to read and write data arrays in the manner of the present embodiments to and from the off-chip memory 9. Other arrangements would, of course, be possible, such as having a respective codec separately in one or more of the video codec 71, CPU 77, GPU 10, or display controller 75.

Thus, in this system, the graphics processor 10 (for example) can store and use data arrays that have been stored in the manner of the present embodiment, for example as graphics textures and/or as frames for display.

Figure 6:
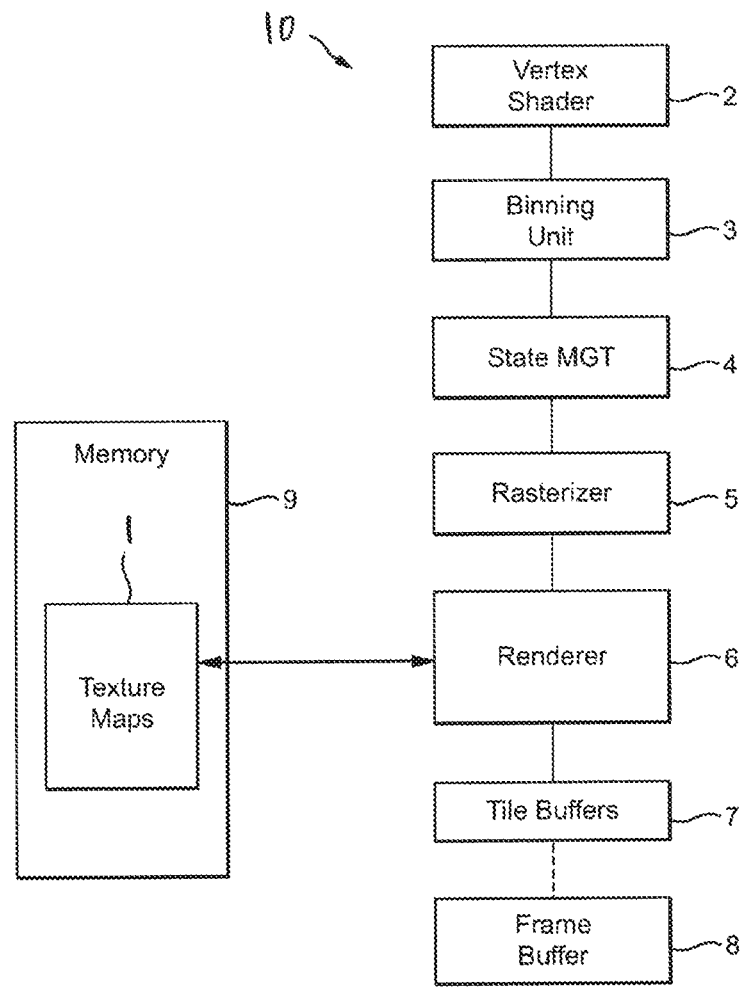
FIG. 6 shows schematically a graphics processing system that may use data arrays stored in accordance with the technology described herein.

FIG. 6 shows an exemplary graphics processor 10 in more detail. In FIG. 6 the graphics processor 10 is a tile-based graphics processor. However, as will be appreciated, and as discussed above, the technology described herein can be implemented in other arrangements of graphics processor (and, indeed, in other data processing systems).

As discussed above, the graphics processor 10 will generate output data arrays, such as output frames intended for display on the display device 73, such as a screen or printer, in response to instructions to render graphics objects, etc. that it receives.

As shown in FIG. 6, the graphics processor 10 includes a vertex shader 2, a binning unit (a tiler) 3, a state management unit 4, a rasterising stage (a rasteriser) 5, and a rendering stage (a renderer) 6 in the form of a rendering pipeline.

The vertex shader 2 receives descriptions of graphics objects to be drawn, vertices, etc., e.g. from a driver (not shown) for the graphics processor 10, and performs appropriate vertex shading operations on those objects and vertices, etc., so as to, for example, perform appropriate transform and lighting operations on the objects and vertices.

The binning unit (tiler) 3 sorts (bins) the various primitives, objects, etc., required for an output to be generated by the graphics processor 10 (such as a frame to be displayed) into the appropriate bins (tile lists) for the tiles that the output to be generated is divided into (since, as discussed above, this exemplary graphics processing system is a tile-based graphics processing system).

The state management unit 4 stores and controls state data and the state of the graphics processing unit to control the graphics processing operation.

The rasteriser 5 takes as its input primitives to be displayed, and rasterises those primitives to sampling positions and fragments to be rendered.

The renderer 6 takes fragments from the rasteriser 5 and renders those fragments to generate the output data (the data for the output (e.g. frame to be displayed) of the graphics processor 10).

The renderer may include a number of different processing units, such as fragment shaders, blenders, texture mappers, etc.

In particular, as shown in FIG. 6, the renderer 6 will, inter alia, access texture maps 1 stored in a memory 9 that is accessible to the graphics processor 10, so as to be able to apply the relevant textures to fragments that it is rendering. The memory 9 where the texture maps 1 are stored may be an on-chip buffer or external memory (e.g. main system memory) that is accessible to the graphics processor 10.

The graphics processor 10 generates its output data arrays, such as output frames, by generating tiles representing different regions of a respective output data array (as it is a tile-based graphics processor). Thus, the output from the rendering pipeline 6 (the rendered fragments) is output to tile buffers 7.

The tile buffers' outputs are then written to a frame buffer 8, e.g. for display. The frame buffer 8 may reside, e.g. in main memory (which memory may be DDR-SDRAM) of the system (not shown). The data from the tile buffers may be downsampled before it is written to the frame buffer, if desired.

The texture maps 1 and the frame buffer 8 may be stored in the same physical memory, or they may be stored in different memories, as desired.

Sometime later, the data array in the frame buffer 8 will be read by a display controller and output to a display device for display (not shown).

The data processing system and graphics processor shown in FIGS. 5 and 6 use the data array storing and decoding arrangement of the embodiment described above with reference to FIGS. 1 to 4 in respect of both the stored texture maps 1 in the memory 9, and when storing output data in the frame buffer 8.

Thus, each texture map 1 that is stored in the memory 9 for use by the rendering unit 6 is stored in the form described above and shown in FIG. 1. Accordingly, when the rendering unit 6 needs to access a texture map, it will read and decode the texture map data in the manner described above with reference to FIGS. 1, 3 and 4.

Similarly, when the generated output data from the graphics processor 10 is written to the frame buffer 8 from the tile buffer 7, that data is processed in the manner described above with reference to FIGS. 1, 2 and 4, to take the data from the tile buffers 7 and store it in the format shown in FIG. 1 in the frame buffer 8. This data can then be read and decoded from the frame buffer 8 in the manner described above with reference to FIGS. 1, 3 and 4 by, e.g., the display controller of the display on which the frame is to be displayed.

It will be appreciated that each of the stages, elements, and units, etc., of the graphics processor as shown in FIG. 6 may be implemented as desired and will accordingly comprise, e.g., appropriate circuits/circuitry, and/or processing logic, programmable logic, programmable circuits/circuitry, etc., for performing the necessary operations and functions, and will provide the appropriate control and processing circuits/circuitry, etc., for performing the technology described herein.

Although, the present embodiment has been described above as dividing the data array into 16×16 super blocks of data elements, other arrangements could be used. For example, the data array could be divided into 4×16 or 16×4 super blocks, if desired.

Also, although the present embodiments have been described above with particular reference to the use of the techniques of the present embodiment with graphics processors and display controllers, the techniques of the technology described herein can be used for other data array and in particular image processing arrangements. For example, they may be used in image signal processors and video decoders and encoders (MPEG/h.264, etc.). In these cases, for example, the techniques of the technology described herein could be used to store an image generated by an image signal processor which is processing data received from an image sensor to make a watchable image out of it. A video encoder/decoder, for example, could load an image (e.g. video frame) stored in the form of the technology described herein to then compress the image using some other standard like h.264, and correspondingly store frames of video data using the techniques of the technology described herein, for example for provision to a graphics processor or a display controller.

As can be seen from the above, the technology described herein, in its embodiments at least, provides a method and apparatus for storing data arrays that can reduce the amount of memory traffic for reading the stored data, and/or make more efficient the memory traffic for reading the stored data. It can accordingly, thereby reduce power consumption, for example.

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of storing an array of data in memory, the method comprising:
dividing the array of data to be stored into a plurality of blocks;
for at least one group of the blocks that the data array has been divided into, storing a set of data representing the group of blocks of the data array in memory, the set of data representing the group of blocks of the data array including:
for each block of the group of blocks, a set of data for that block of the group of blocks; and
a size indication for each of one or more of the blocks of the group of blocks, the size indication for a block of a group of blocks indicating the size in memory of the set of data for that block of the group included in the stored set of data representing the group of blocks;
the method further comprising:
storing, for each group of blocks of the data array for which a set of data has been stored, a set of header data separately to the set of data representing the group of blocks of the data array, the header data for a group of blocks of the data array indicating the total size in memory of the set of data for the group of blocks of the data array that the header data relates to:
wherein the set of data representing each group of blocks for which a set of data has been stored is stored at a location that can be determined using the header data that is stored for that group of blocks; and
the set of data for each of the one or more of the blocks of the group of blocks for which a size indication has been stored is stored at a location that can be determined using the size indication that is stored for that block.

2. The method of claim 1, wherein the sets of data for the blocks of the group of blocks included in the set of data representing the group of blocks of the data array comprise compressed representations of the blocks of the group of blocks.

3. The method of claim 1, wherein the set of data representing the group of blocks of the data array includes a size indication for each of all except one block of the group of blocks.

4. The method of claim 1, further comprising:
for at least one other group of the blocks that the data array has been divided into:
storing in memory:
a set of data representing the group of blocks of the data array that represents each block of the group of blocks of the data array in an uncompressed form and that does not include a size indication for any of the blocks of the group of blocks; and
a set of header data separately to the set of data representing the group of blocks of the data array, the header data for the group of blocks of the data array indicating that the data for each block of the group of blocks of the data array that the header data relates to has been stored in an uncompressed form.

5. The method of claim 1, comprising:
storing each set of data representing a group of blocks of the data array in a fixed-size and address-aligned block in memory.

6. The method of claim 1, wherein the separate set of header data for each group of blocks indicates the actual size of the set of data that is stored for the group of blocks.

7. The method of claim 6, wherein one size indication value that can be indicated in the separate set of header data is predefined as indicating that the set of data for each block of the group of blocks has been stored in an uncompressed form.

8. The method of claim 1, comprising storing the separate header data for the groups of blocks of the data array as one or more header data blocks in a header buffer, with each header data block storing the header data for plural groups of blocks of the data array.

9. The method of claim 1, wherein the data array is a graphics texture, or a frame for display.

10. An apparatus for storing an array of data in memory, the apparatus comprising:
an encoding circuit configured to store, for at least one group of blocks of a plurality of blocks that the data array has been divided into for encoding purposes, a set of data representing the group of blocks of the data array in memory, the set of data representing the group of blocks of the data array including:
for each block of the group of blocks, a set of data for that block of the group of blocks; and
a size indication for each of one or more of the blocks of the group of blocks, the size indication for a block of a group of blocks indicating the size in memory of the set of data for that block of the group included in the stored set of data representing the group of blocks;
the apparatus further comprising:
a header generating circuit configured to store for a group of blocks of the data array for which a set of data has been stored, a set of header data separately to the set of data representing the group of blocks of the data array, the header data for a group of blocks of the data array indicating the total size in memory of the set of data for the group of blocks of the data array that the header data relates to:
wherein the set of data representing each group of blocks for which a set of data has been stored is stored at a location that can be determined using the header data that the header generating circuit is configured to store for that group of blocks; and
the set of data for each of the one or more of the blocks of the group of blocks for which a size indication has been stored is stored at a location that can be determined using the size indication that is stored by the encoding circuit for that block.

11. The apparatus of claim 10, wherein the encoding circuit is configured to encode the data for the blocks of the data array such that the sets of data for the blocks of a group of blocks included in the set of data representing the group of blocks of the data array comprise compressed representations of the blocks of the group of blocks.

12. The apparatus of claim 10, wherein the set of data representing the group of blocks of the data array includes a size indication for each of all except one block of the group of blocks.

13. The apparatus of claim 10, wherein the encoding circuit is configured to:
determine whether encoding the blocks of data of a group of blocks of the data array would result in a set of encoded data that is larger than the size of the uncompressed input data for that group of blocks, and to, in that event, store in memory for the group of blocks of the data array:

a set of data representing the group of blocks of the data array that represents each block of the group of blocks of the data array in an uncompressed form and that does not include a size indication for any of the blocks of the group of blocks; and a set of header data separately to the set of data representing the group of blocks of the data array, the header data for the group of blocks of the data array indicating that the data for each block of the group of blocks of the data array that the header data relates to has been stored in an uncompressed form.

14. The apparatus of claim 10, wherein the encoding circuit is configured to:
store each set of data representing a group of blocks of the data array in a fixed-size and address-aligned block in memory.

15. The apparatus of claim 10, wherein the separate set of header data for each group of blocks indicates the actual size of the set of data that is stored for the group of blocks.

16. The apparatus of claim 15, wherein one size indication value that can be indicated in the separate set of header data is predefined as indicating that the set of data for each block of the group of blocks has been stored in an uncompressed form.

17. The apparatus of claim 10, wherein the header generating circuit is configured to store the separate header data for the groups of blocks of the data array as one or more header data blocks in a header buffer, with each header data block storing the header data for plural groups of blocks of the data array.

18. An apparatus for determining the value of a data element of a stored data array in a data processing system, the apparatus comprising:
a header data retrieving circuit configured to:
determine the memory location of stored header data for a group of blocks of the data array that the data element falls within; and
read the header data and determine therefrom an indication of the total size in memory of a stored set of data for the group of blocks of the data array that the data element falls within;

a data extracting circuit configured to:
use the determined indication of the total size in memory of the stored set of data for the group of blocks from the header data for the group of blocks that the data element falls within to fetch the stored set of data for the group of blocks;
extract a set of header data from the set of data for the group of blocks and determine therefrom a size indication for each of one or more of the blocks of the group of blocks, the size indication for a block of the group of blocks indicating the size in memory of a set of data for that block of the group included in the stored set of data representing the group of blocks; and
use the determined size indications for at least one of the blocks of the group of blocks, to extract the set of data for the data block containing the data element whose value is required from the set of data for the group of blocks; and a decoding circuit configured to:
use the extracted set of data for the data block containing the data element whose value is required to determine a data value for the data element whose value is required.

19. A non-transitory computer readable storage medium storing computer software code that when executed on a data processor performs a method of storing an array of data in memory, the method comprising:
dividing the array of data to be stored into a plurality of blocks;
for at least one group of the blocks that the data array has been divided into, storing a set of data representing the group of blocks of the data array in memory, the set of data representing the group of blocks of the data array including:
for each block of the group of blocks, a set of data for that block of the group of blocks; and
a size indication for each of one or more of the blocks of the group of blocks, the size indication for a block of a group of blocks indicating the size in memory of the set of data for that block of the group included in the stored set of data representing the group of blocks;

the method further comprising:
storing, for each group of blocks of the data array for which a set of data has been stored, a set of header data separately to the set of data representing the group of blocks of the data array, the header data for a group of blocks of the data array indicating the total size in memory of the set of data for the group of blocks of the data array that the header data relates to:
wherein the set of data representing each group of blocks for which a set of data has been stored is stored at a location that can be determined using the header data that is stored for that group of blocks; and
the set of data for each of the one or more of the blocks of the group of blocks for which a size indication has been stored is stored at a location that can be determined using the size indication that is stored for that block.

* * * * *